(12) United States Patent
Dumas et al.

(10) Patent No.: US 12,081,734 B2
(45) Date of Patent: Sep. 3, 2024

(54) METHOD AND APPARATUS FOR CODING/DECODING PICTURE DATA

(71) Applicant: INTERDIGITAL CE PATENT HOLDINGS, SAS, Paris (FR)

(72) Inventors: Thierry Dumas, Rennes (FR); Franck Galpin, Thorigne-Fouillard (FR); Gagan Rath, Rennes (FR); Fabrice Leleannec, Betton (FR)

(73) Assignee: INTERDIGITAL CE PATENT HOLDINGS, SAS, Paris (FR)

( * ) Notice: Subject to any disclaimer, the term of this patent is extended or adjusted under 35 U.S.C. 154(b) by 224 days.

(21) Appl. No.: 17/620,502

(22) PCT Filed: Jun. 23, 2020

(86) PCT No.: PCT/EP2020/067411
§ 371 (c)(1),
(2) Date: Dec. 17, 2021

(87) PCT Pub. No.: WO2020/260228
PCT Pub. Date: Dec. 30, 2020

(65) Prior Publication Data
US 2022/0360767 A1    Nov. 10, 2022

(30) Foreign Application Priority Data
Jun. 25, 2019   (EP) .................................. 19305844.3

(51) Int. Cl.
*H04N 19/105* (2014.01)
*H04N 19/132* (2014.01)
(Continued)

(52) U.S. Cl.
CPC ......... *H04N 19/105* (2014.11); *H04N 19/132* (2014.11); *H04N 19/159* (2014.11); *H04N 19/176* (2014.11)

(58) Field of Classification Search
None
See application file for complete search history.

(56) References Cited

U.S. PATENT DOCUMENTS 11,234,015 B2 *   1/2022   Lee ...................... H04N 19/159
2021/0385469 A1 * 12/2021   Deng .................... H04N 19/30
(Continued)

OTHER PUBLICATIONS

Anonymous, "Series H: Audiovisual and Multimedia Systems, Infrastructure of audiovisual services—Coding of moving video, High efficiency video coding", ITU-T H.265 Telecommunication Standardization Sector of ITU, Recommendation ITU-T H.265, Oct. 2014, 540 pages.

(Continued)

*Primary Examiner* — Reza Aghevli
(74) *Attorney, Agent, or Firm* — CONDO ROCCIA KOPTIW LLP

(57) ABSTRACT

The disclosure relates to a method for encoding image data, the method including intra-predicting, or predicting by combining inter-prediction and intra-prediction, a first block of the image data by using an intra-prediction mode using a first single transformation obtained by taking account of the first block size. The disclosure also relates to a method for encoding image data, a variable coding length being used for signaling a plurality of Prediction Modes by the encoding, the method comprising:—intra-predicting a first block of the image data by using an intra-prediction mode using a first transformation, the first transformation being obtained by taking account of the first block size, —encoding information signaling a use of the intra-prediction mode in a bitstream, the information being encoded as one of the plurality of Prediction Modes. The disclosure further relates to the corresponding decoding methods, devices and media.

28 Claims, 22 Drawing Sheets

(51) Int. Cl.
   *H04N 19/159*    (2014.01)
   *H04N 19/176*    (2014.01)

(56) References Cited

U.S. PATENT DOCUMENTS

| | | | | |
|---|---|---|---|---|
| 2022/0014752 | A1* | 1/2022 | Deng | H04N 19/11 |
| 2022/0060745 | A1* | 2/2022 | Deng | H04N 19/70 |
| 2022/0094922 | A1* | 3/2022 | Tsai | H04N 19/167 |
| 2022/0109885 | A1* | 4/2022 | Deng | H04N 19/176 |
| 2022/0279169 | A1* | 9/2022 | Deng | H04N 19/176 |
| 2022/0286680 | A1* | 9/2022 | Van der Auwera | H04N 19/82 |
| 2022/0385926 | A1* | 12/2022 | Deng | H04N 19/593 |
| 2023/0117813 | A1* | 4/2023 | Deng | H04N 19/30 |

OTHER PUBLICATIONS

Kotra et al., "CE3 6.6.1: A Simple 6-MPM List Construction with Truncated Binary Coding for Non-MPM Signaling", Joint Video Experts Team (JVET) of ITU-T SG 16 WP 3 and ISO/IEC JTC 1/SC 29/WG 11, Document: JVET-L0222-v2, 12th Meeting: Macao, China, Oct. 3, 2018, 6 pages.

Dumas et al., "CE3-related: Simplification of Matrix Intra Prediction (MIP)", Joint Video Experts Team (JVET) of ITU-T SG 16 WP 3 and ISO/IEC JTC 1/SC 29/WG 11, Document: JVET-O0523-v3, 15th Meeting: Gothenburg, Sweden, Jul. 3, 2019, 10 pages.

Pham Van et al., "CE10: CIIP with position-independent weights (Test CE10-1.1)", Joint Video Experts Team (JVET) of ITU-T SG 16 WP 3 and ISO/IEC JTC 1/SC 29/WG 11, Document: JVET-N03032_v1, 14th Meeting, Geneva, Switzerland, Mar. 19, 2019, 3 pages.

Pfaff et al., "CE3: affine linear weighted intra prediction (CE3-4.1, CE3-4.2)", Joint Video Exploration Team (JVET) of ITU-T SG 16 WP 3 and ISO/IEC JTC 1/SC 29/WG 11, Document: JVET-N0217, 14th Meeting: Geneva, Switzerland, Mar. 19, 2019, 17 pages.

Anonymous, "Information Technology—Generic Coding of Moving Pictures and Associated Audio Information: Systems", International Organization for Standardization (ISO) and the International Electrotechnical Commission, (IEC), Document: ISO/IEC 13818-1, Fifth Edition, Jul. 11, 2014, 131 pages.

Anonymous, "Information Technology—Generic Coding of Moving Pictures and Associated Audio Information: Video", ISO 13818-2: 1995 (E), Recommendation ITU-T H.262, International Organization for Standardization (ISO) and the International Electrotechnical Commission (IEC), International Standard 13818-2, 1995, 255 pages.

ITU-T, "High Efficiency Video Coding", Recommendation ITU-T H.265, Series H: Audiovisual and Multimedia Systems, Infrastructure of Audiovisual Services—Coding of Moving Video, Apr. 2013, 317 pages.

ITU-T, "Versatile Video Coding", Recommendation ITU-T H.266, Series H: Audiovisual and Multimedia Systems Infrastructure of Audiovisual Services—Coding of Moving Video, Aug. 2020, 516 pages.

* cited by examiner reference samples for intra prediction in H.266/VVC in the case of a square current block ($W = H = N$), the pixel values at coordinates $(x, y)$ being indicated in the figure by $P(x, y)$ prediction direction for square blocks in H.266/VCC top and left CU locations for deriving the MPM list in for different block shapes

| Conditions | | MPM[0] | MPM[1] | MPM[2] | MPM[3] | MPM[4] | MPM[5] |
|---|---|---|---|---|---|---|---|
| L=A | L≠PLANAR_IDX and L≠DC_IDX | PLANAR_IDX | L | L-1 | L+1 | DC_IDX | L-2 |
| | otherwise | PLANAR_IDX | DC_IDX | VER_IDX | HOR_IDX | VER_IDX-4 | VER_IDX+4 |
| L≠A | L > DC_IDX and A > DC_IDX | PLANAR_IDX | L | A | DC_IDX | max(L,A)- 2, if L and A are adjacent else max(L,A)-1 | max(L,A)+ 2, if L and A are adjacent else max(L,A)+1 |
| | otherwise, L + A >= 2 | PLANAR_IDX | max(L,A) | DC_IDX | max(L,A)- 1 | max(L,A)+1 | max(L,A)- 2 |
| | otherwise, otherwise | PLANAR_IDX | DC_IDX | VER_IDX | HOR_IDX | VER_IDX-4 | VER_IDX+4 |

MPM derivation in VTM-5.0. A and L denote the predictions modes of above and left CUs respectively

Fig. 6

| Candidate Index | Code |
|---|---|
| MPM[0] | 0 |
| MPM[1] | 10 |
| MPM[2] | 110 |
| MPM[3] | 1110 |
| MPM[4] | 11110 |
| MPM[5] | 11111 |

MPM signaling in VTM-5.0

Fig. 7

| Candidate index | Code |
|---|---|
| MPM[1] | 0 |
| MPM[2] | 10 |
| MPM[3] | 110 |
| MPM[4] | 1110 |
| MPM[5] | 1111 |

MPM signaling when *multiRefIdx* > 0 in VTM-5.0

Fig. 8

Fig. 11 affine linear weighted intra prediction process for a 8x4 block

| Candidate index | Code |
|---|---|
| SMIP | 1 |
| MPM[0] | 00 |
| MPM[1] | 010 |
| MPM[2] | 0110 |
| MPM[3] | 01110 |
| MPM[4] | 011110 |
| MPM[5] | 011111 |

MPM signaling when *mipFlag* is placed before the bit signaling the first MPM

Fig. 13

| Candidate Index | code |
|---|---|
| MPM[0] | 0 |
| SMIP | 11 |
| MPM[1] | 100 |
| MPM[2] | 1010 |
| MPM[3] | 10110 |
| MPM[4] | 101110 |
| MPM[5] | 101111 |

MPM signaling when *mipFlag* is placed before the bit signaling the first MPM

Fig. 14

| Conditions | | MPM[0] | MPM[1] | MPM[2] | MPM[3] | MPM[4] | MPM[5] |
|---|---|---|---|---|---|---|---|
| L=A | L≠PLANAR_IDX and L≠DC_IDX | PLANAR_IDX | L | L-1 | L+1 | SMIP | DC_IDX |
| | otherwise | PLANAR_IDX | SMIP | DC_IDX | VER_IDX | HOR_IDX | VER_IDX-4 |
| L≠A | L > DC_IDX and A > DC_IDX | PLANAR_IDX | L | A | SMIP | DC_IDX | max(L,A)- 2, if L and A are adjacent else max(L,A)-1 |
| | otherwise  L + A >= 2 | PLANAR_IDX | max(L,A) | SMIP | DC_IDX | max(L,A)- 1 | max(L,A)+1 |
| | otherwise | PLANAR_IDX | SMIP | DC_IDX | VER_IDX | HOR_IDX | VER_IDX-4 |

MPM derivation when SMIP is put into the MPM list, before DC

Fig. 15

| Conditions | | MPM[0] | MPM[1] | MPM[2] | MPM[3] | MPM[4] | MPM[5] |
|---|---|---|---|---|---|---|---|
| L=A | L≠PLANAR_IDX and L≠DC_IDX | PLANAR_IDX | L | L-1 | L+1 | DC_IDX | SMIP |
| | otherwise | PLANAR_IDX | DC_IDX | SMIP | VER_IDX | HOR_IDX | VER_IDX-4 |
| L≠A | L > DC_IDX and A > DC_IDX | PLANAR_IDX | L | A | DC_IDX | SMIP | max(L,A)- 2, if L and A are adjacent else max(L,A)-1 |
| | otherwise L + A >= 2 | PLANAR_IDX | max(L,A) | DC_IDX | SMIP | max(L,A)- 1 | max(L,A)+1 |
| | otherwise | PLANAR_IDX | DC_IDX | SMIP | VER_IDX | HOR_IDX | VER_IDX-4 |

MPM derivation when SMIP is put into the MPM list, after DC

Fig. 16 prediction of the current block $Y$ via each of the 67 intra prediction mode in H.266/VVC for $4 \times 4$ blocks (the generalization to $8 \times 8$ blocks and $16 \times 16$ blocks is straightforward)

```
0 0 0 0 0 0 0 0 0 0 0 0 0 0 0 0
0 0 0 0 0 0 0 0 0 0 0 0 0 0 0 0
0 0 0 0 0 0 0 0 0 0 0 0 0 0 0 0
0 0 0 0 0 0 0 0 0 0 0 0 0 0 0 0
0 0 0 0 0 0 0 0 0 0 0 0 0 0 0 0
0 0 0 0 0 0 0 0 0 0 0 0 0 0 0 0
0 0 0 0 0 0 0 0 0 0 0 0 0 0 0 0
0 0 0 0 0 0 0 0 0 0 0 0 0 0 0 0
0 0 0 0 0 0 0 0 0 0 0 0 0 0 0 0
0 0 0 0 0 0 0 0 0 0 0 0 0 0 0 0
1 0 0 0 0 0 0 0 0 0 0 0 0 0 0 0
0 1 0 0 1 0 0 0 0 0 0 0 0 0 0 0
0 0 1 0 0 1 0 0 1 0 0 0 0 0 0 0
0 0 0 1 0 0 1 0 0 1 0 0 1 0 0 0
0 0 0 0 0 0 0 1 0 0 1 0 0 1 0 0
0 0 0 0 0 0 0 0 0 0 0 1 0 0 1 0
0 0 0 0 0 0 0 0 0 0 0 0 0 0 0 1
```

$U_2$ for 4 × 4 blocks

```
0 0 0 0 0 0 0 0 0 0 0 0 0 0 0 0
0 0 0 0 0 0 0 0 0 0 0 0 0 0 0 0
0 0 0 0 0 0 0 0 0 0 0 0 0 0 0 0
0 0 0 0 0 0 0 0 0 0 0 0 0 0 0 0
0 0 0 0 0 0 0 0 0 0 0 0 0 0 0 0
0 0 0 0 0 0 0 0 0 0 0 0 0 0 0 0
0 0 0 0 0 0 0 0 0 0 0 0 0 0 0 0
0 0 0 0 0 0 0 0 0 0 0 0 0 0 0 0
0 0 0 0 0 0 0 0 0 0 0 0 0 0 0 0
0 0 0 0 0 0 0 0 0 0 0 0 0 0 0 0
1 1 1 1 0 0 0 0 0 0 0 0 0 0 0 0
0 0 0 0 1 1 1 1 0 0 0 0 0 0 0 0
0 0 0 0 0 0 0 0 1 1 1 1 0 0 0 0
0 0 0 0 0 0 0 0 0 0 0 0 1 1 1 1
0 0 0 0 0 0 0 0 0 0 0 0 0 0 0 0
0 0 0 0 0 0 0 0 0 0 0 0 0 0 0 0
0 0 0 0 0 0 0 0 0 0 0 0 0 0 0 0
0 0 0 0 0 0 0 0 0 0 0 0 0 0 0 0
```

$U_{18}$ for 4 × 4 blocks

```
1 0 0 0 0 1 0 0 0 0 1 0 0 0 0 1
0 1 0 0 0 0 1 0 0 0 0 1 0 0 0 0
0 0 1 0 0 0 0 1 0 0 0 0 0 0 0 0
0 0 0 1 0 0 0 0 0 0 0 0 0 0 0 0
0 0 0 0 0 0 0 0 0 0 0 0 0 0 0 0
0 0 0 0 0 0 0 0 0 0 0 0 0 0 0 0
0 0 0 0 0 0 0 0 0 0 0 0 0 0 0 0
0 0 0 0 0 0 0 0 0 0 0 0 0 0 0 0
0 0 0 0 0 0 0 0 0 0 0 0 0 0 0 0
0 0 0 0 0 0 0 0 0 0 0 0 0 0 0 0
0 0 0 0 1 0 0 0 0 1 0 0 0 0 1 0
0 0 0 0 0 0 0 0 1 0 0 0 0 1 0 0
0 0 0 0 0 0 0 0 0 0 0 0 1 0 0 0
0 0 0 0 0 0 0 0 0 0 0 0 0 0 0 0
0 0 0 0 0 0 0 0 0 0 0 0 0 0 0 0
0 0 0 0 0 0 0 0 0 0 0 0 0 0 0 0
0 0 0 0 0 0 0 0 0 0 0 0 0 0 0 0
0 0 0 0 0 0 0 0 0 0 0 0 0 0 0 0
```

$U_{34}$ for 4 × 4 blocks

Fig. 19

$$\begin{matrix}
0 & 0 & 0 & 0 & 0 & 0 & 0 & 0 & 0 & 0 & 0 & 0 & 0 & 0 & 0 & 0 \\
1 & 0 & 0 & 0 & 1 & 0 & 0 & 0 & 1 & 0 & 0 & 0 & 1 & 0 & 0 & 0 \\
0 & 1 & 0 & 0 & 0 & 1 & 0 & 0 & 0 & 1 & 0 & 0 & 0 & 1 & 0 & 0 \\
0 & 0 & 1 & 0 & 0 & 0 & 1 & 0 & 0 & 0 & 1 & 0 & 0 & 0 & 1 & 0 \\
0 & 0 & 0 & 1 & 0 & 0 & 0 & 1 & 0 & 0 & 0 & 1 & 0 & 0 & 0 & 1 \\
0 & 0 & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 0 & 0
\end{matrix}$$

$U_{50}$ for $4 \times 4$ blocks

Fig. 19 (cont.)

$$\begin{array}{rrrr}
110 & 8 & 134 & 4 \\
123 & 70 & 33 & 31 \\
20 & 192 & 15 & 28 \\
-23 & 249 & 4 & 26 \\
4 & 31 & 150 & 71 \\
23 & 82 & 62 & 89 \\
-5 & 155 & 26 & 81 \\
-26 & 205 & 7 & 71 \\
-1 & 24 & 33 & 201 \\
-3 & 65 & 20 & 175 \\
-23 & 124 & 3 & 153 \\
-36 & 168 & -5 & 129 \\
-5 & 19 & -18 & 260 \\
-11 & 49 & -11 & 229 \\
-26 & 93 & -14 & 203 \\
-35 & 132 & -16 & 175
\end{array}$$

$$\overline{M}_0$$

$$0 \quad 0 \quad -1 \quad 0 \quad 0 \quad -1 \quad -2 \quad 0 \quad 0 \quad -1 \quad -1 \quad -1 \quad 0 \quad 0 \quad 0 \quad 0$$

$$\overline{b}_0$$

illustration of $\overline{M}_0$ and $\overline{b}_0$

Fig. 20

$$\begin{array}{rrrrrrrr}
17 & 73 & 14 & 7 & 54 & 76 & 10 & 6 \\
-40 & 112 & 95 & 19 & 0 & 36 & 19 & 16 \\
-26 & 6 & 125 & 106 & -10 & 20 & 16 & 18 \\
-18 & 3 & 16 & 223 & -7 & 9 & 12 & 18 \\
-14 & 21 & 19 & 17 & -20 & 135 & 83 & 15 \\
-39 & 50 & 54 & 42 & -33 & 77 & 66 & 40 \\
-39 & 12 & 80 & 96 & -30 & 43 & 49 & 46 \\
-30 & 1 & 32 & 172 & -26 & 27 & 36 & 44 \\
-12 & 11 & 12 & 16 & -18 & 8 & 144 & 95 \\
-34 & 24 & 35 & 42 & -30 & 17 & 101 & 101 \\
-35 & 4 & 49 & 86 & -33 & 17 & 72 & 95 \\
-34 & 1 & 27 & 137 & -30 & 13 & 55 & 86 \\
-10 & 6 & 6 & 15 & -11 & -1 & 20 & 231 \\
-25 & 13 & 21 & 39 & -20 & 3 & 34 & 192 \\
-29 & 2 & 34 & 71 & -26 & 7 & 36 & 162 \\
-30 & -1 & 21 & 113 & -26 & 7 & 32 & 141 \\
\end{array}$$

$$\overline{M}_1$$

0, -1, 0, -1, -1, -1, -1, 0, 0, 0, 0, 0, -1, -1, -1, 0

$$\overline{b}_1$$

illustration of $\overline{M}_1$ and $\overline{b}_1$

$\overline{M}_2$

```
-1  -3  -4  -2   3  -2   1   4  -1  -4  -2  -2   0   0   2   3   2  -3  -2  -1   4   7 ...
...  3   4   2   1  -6   3   7   9   6   2   1   1   1   7   6   6   6   0   2   3   3 ...
...  6   7   9   8   5  -2  -1   0   5   6   9   7   8   5   5   1   4   3   6   5   3
```

$\overline{b}_2$ illustration of $\overline{M}_2$ and $\overline{b}_2$

Fig. 22

METHOD AND APPARATUS FOR CODING/DECODING PICTURE DATA

CROSS REFERENCE TO RELATED APPLICATIONS

This application is a U.S. National Stage Application under 35 U.S.C. 371 of International Patent Application No. PCT/EP2020/067411, filed Jun. 23, 2020, which is incorporated herein by reference in its entirety.

This application claims the benefit of European Patent Application No. 19305844, filed Jun. 25, 2019, which is incorporated herein by reference in its entirety.

1. Technical Field

The present embodiments generally relate to encoding/decoding of picture data

2. Background

The present section is intended to introduce the reader to various aspects of art, which may be related to various aspects of at least one of the present embodiments that is described and/or claimed below. This discussion is believed to be helpful in providing the reader with background information to facilitate a better understanding of the various aspects of at least one embodiment. Accordingly, it should be understood that these statements are to be read in this light.

To achieve high compression efficiency, video coding schemes usually employ prediction and transform to leverage spatial and temporal redundancy in the video content. Generally, intra or inter prediction is used to exploit the intra or inter frame correlation. Then the differences between an original picture of the video and a predicted picture, often denoted as prediction errors or prediction residuals, are transformed, quantized and entropy coded. To reconstruct the picture, the compressed data is decoded by inverse processes corresponding to the prediction, transform, quantization and entropy coding.

3. SUMMARY

Some embodiments of the present disclosure enable at least one disadvantage to be resolved by proposing a method for encoding image data, the method including intra-predicting, or predicting by combining inter-prediction and intra-prediction. The disclosure further relates to the corresponding decoding methods, devices and media.

4. BRIEF DESCRIPTION OF DRAWINGS

FIG. 6 shows an exemplary MPM signaling

FIG. 7 shows an exemplary MPM derivation

FIG. 8 shows an exemplary MPM signaling when multiRefIdx>0 in VTM-5.0

Figure 9:
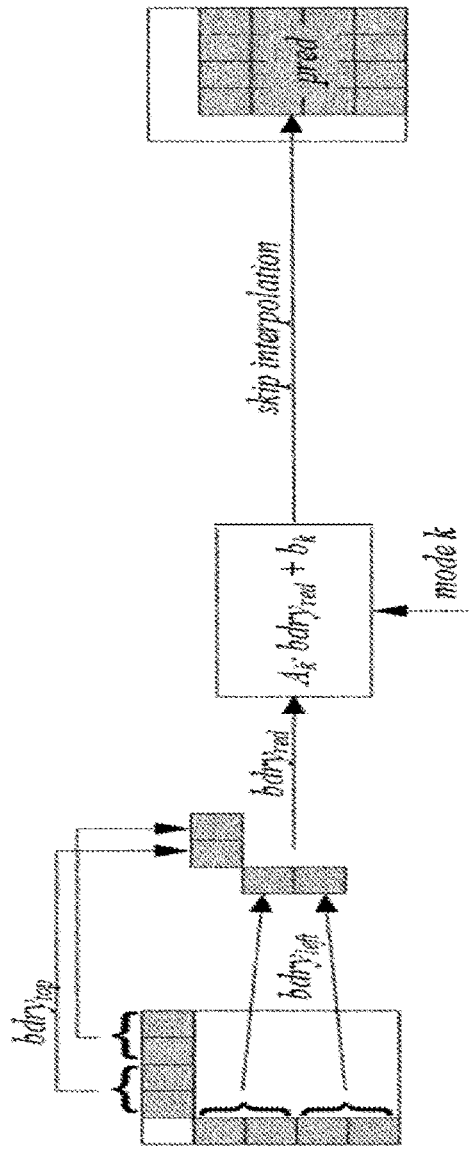
Figure 10:
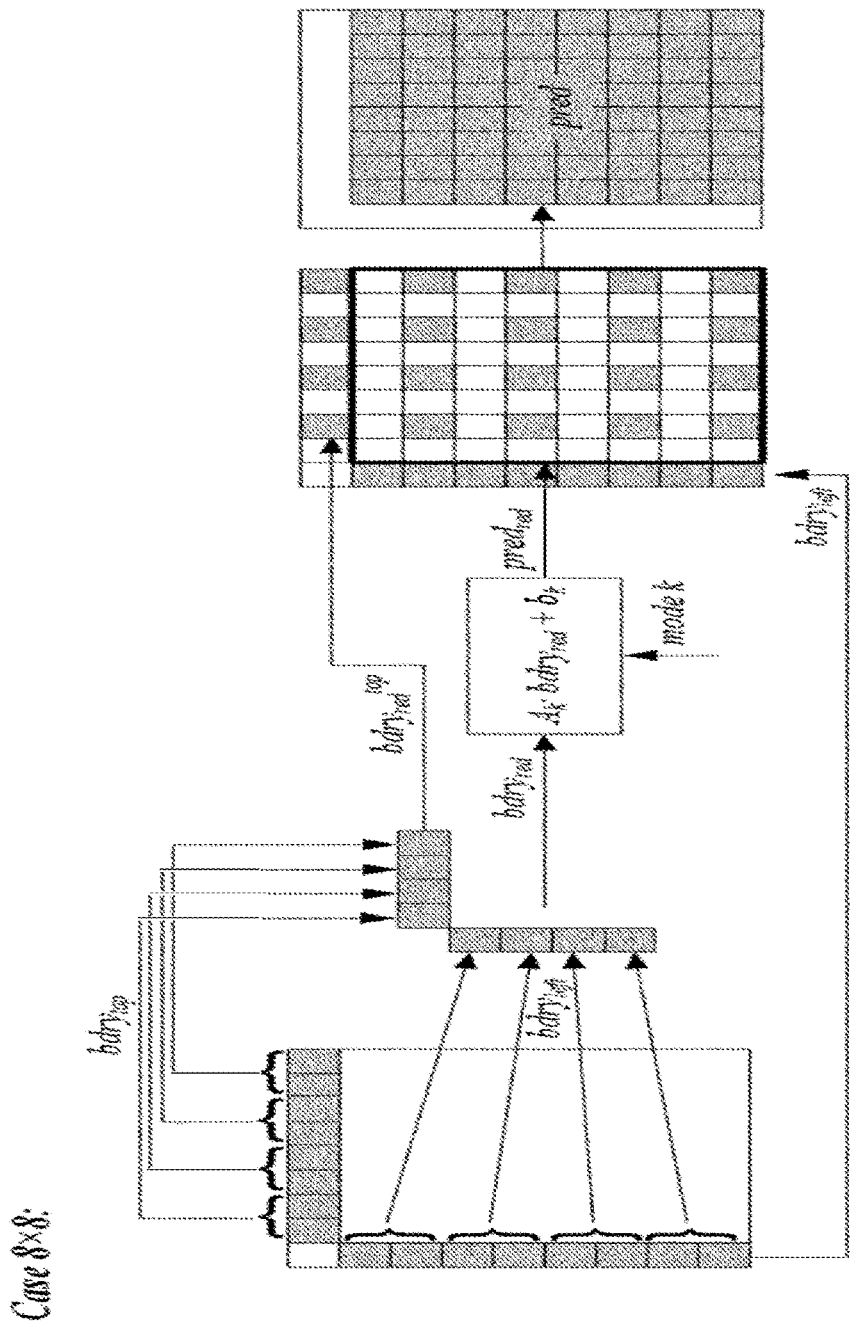
Figure 11:
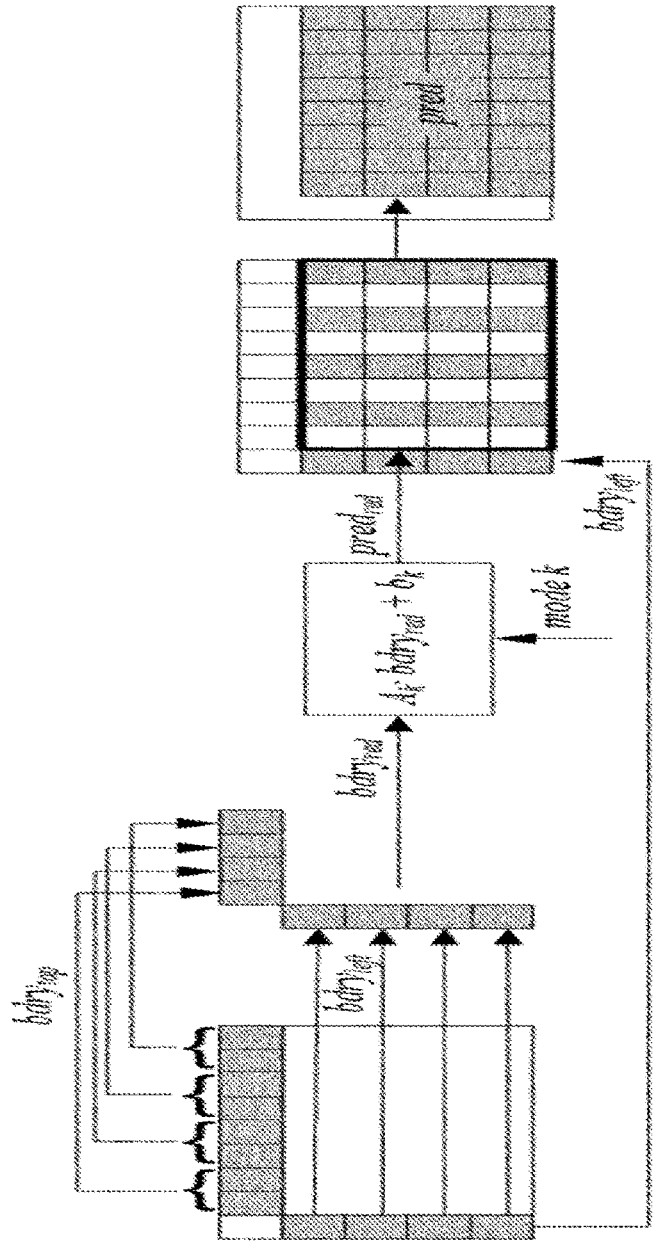
Figure 12:
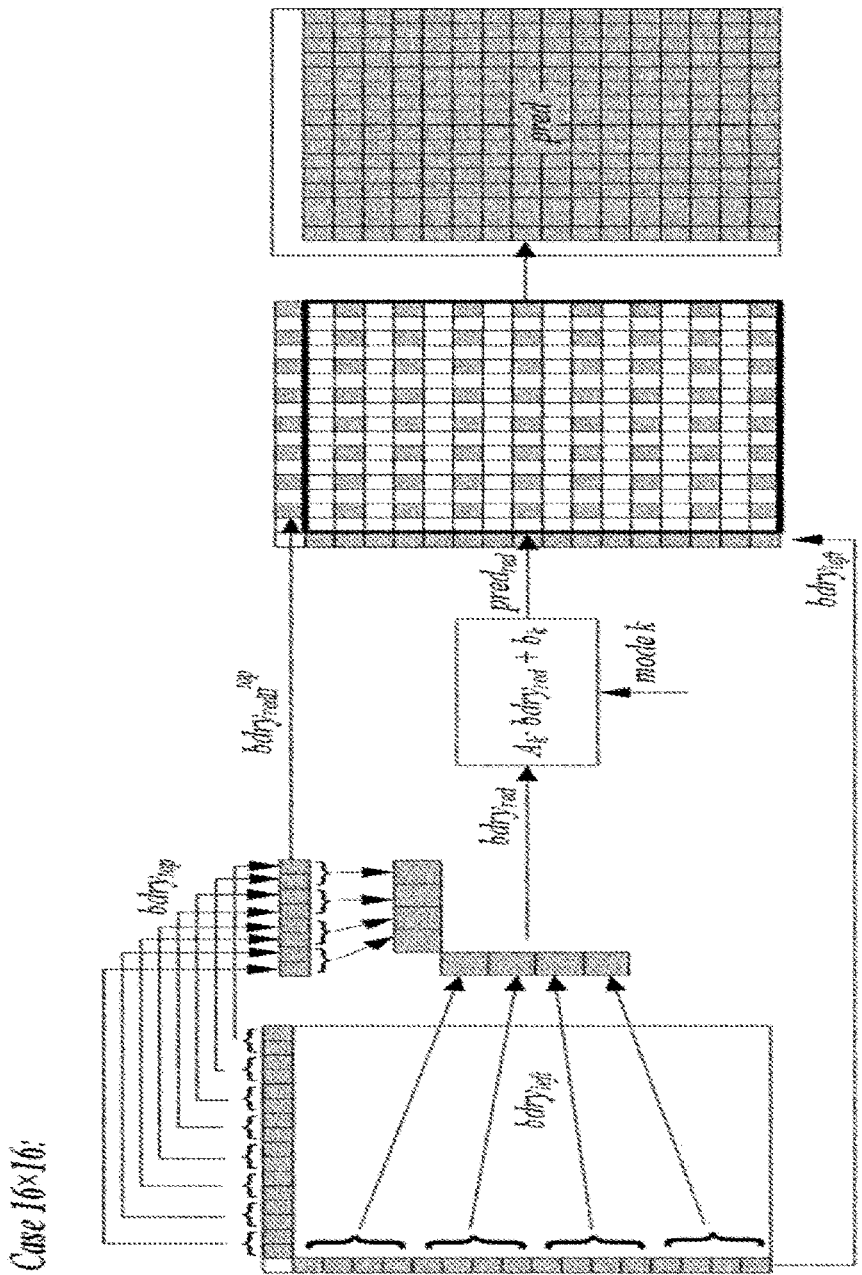
Figure 17:
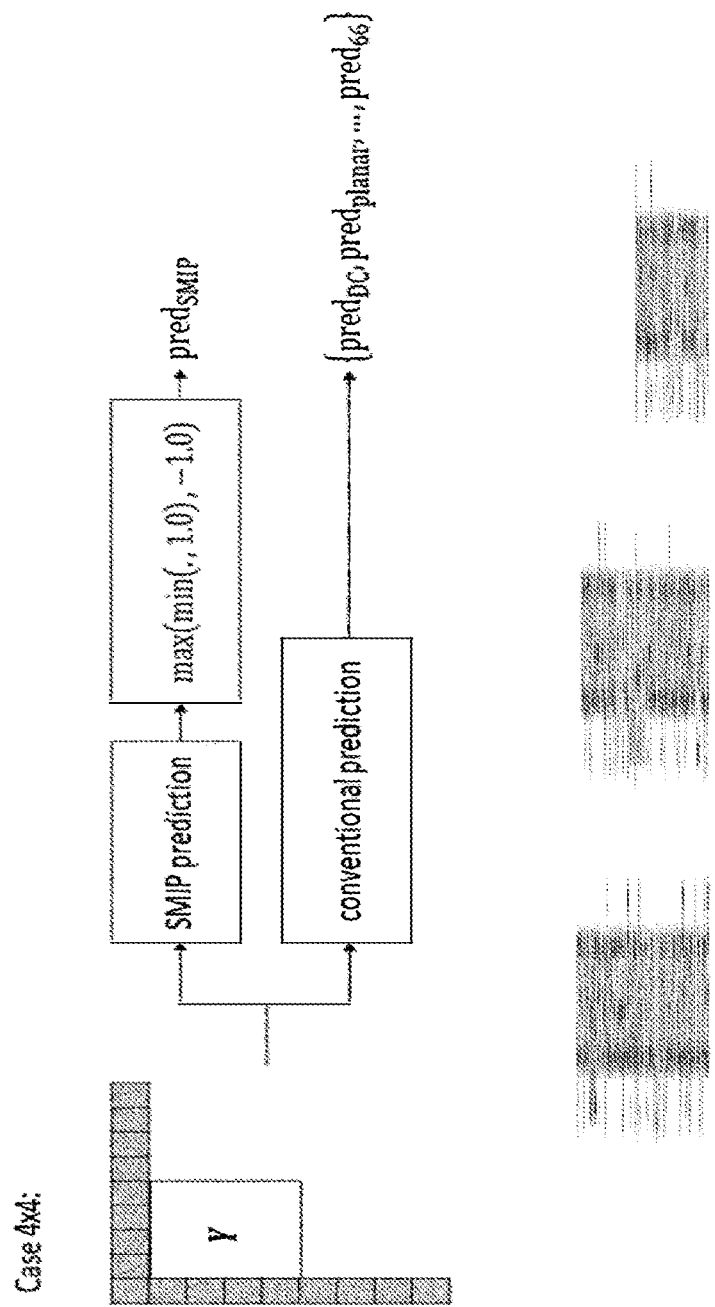
Figure 18:
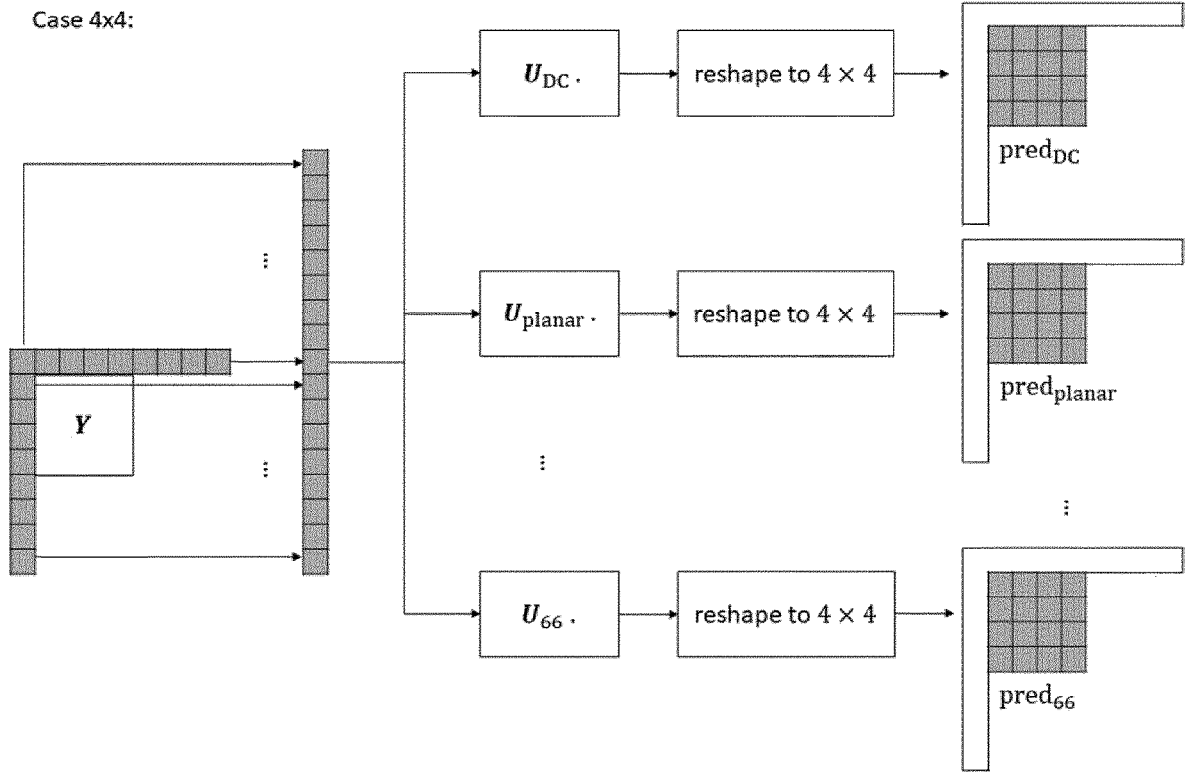

FIG. 9 shows an exemplary affine linear weighted intra prediction process for a 4×4 block FIG. 10 shows an exemplary affine linear weighted intra prediction process fora 8×4 block FIG. 11 shows an exemplary affine linear weighted intra prediction process for a 16×16 block FIG. 12 shows an exemplary MPM signaling when mipFlag is placed before the bit signaling the first MPM FIG. 13 shows an exemplary MPM signaling when mipFlag is placed before the bit signaling the first MPM FIG. 14 shows an exemplary MPM derivation when SMIP is put into the MPM list, before DC FIG. 15 shows an exemplary MPM derivation when SMIP is put into the MPM list, before DC FIG. 16 shows an exemplary MPM derivation when SMIP is put into the MPM list, after DC FIG. 17 shows an exemplary prediction graph;

FIG. 18 shows an exemplary prediction of a current block

FIG. 19 shows an exemplary values of U2, U18, U34 and U50 of 4×4 blocks

Figure 22:
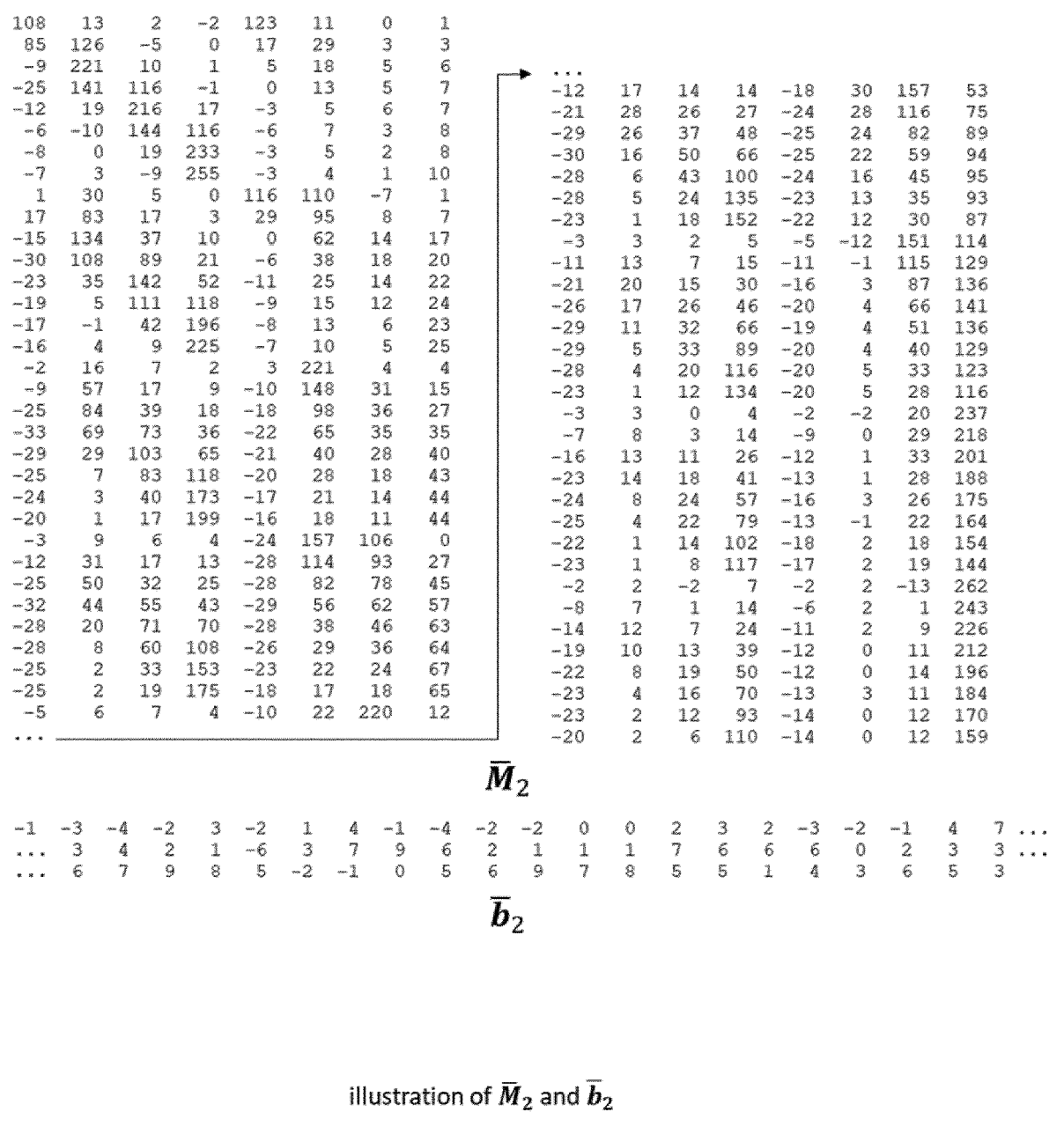
Figure 23:
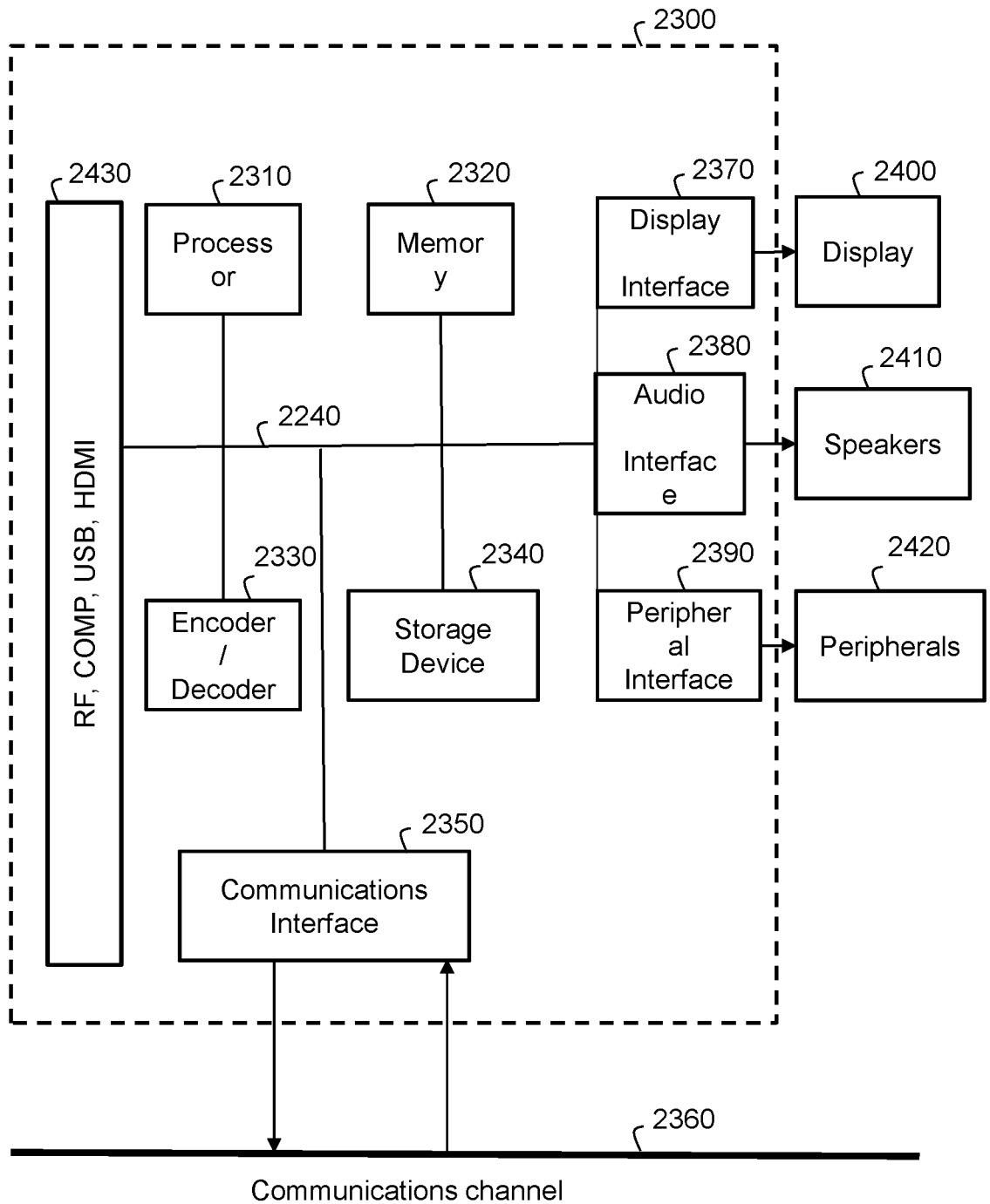

FIG. 20 shows an exemplary illustration of $\overline{M}_0$ and $\overline{b}_0$ FIG. 21 shows an exemplary illustration of $\overline{M}_1$ and $\overline{b}_1$ FIG. 22 shows an exemplary illustration of $\overline{M}_2$ and $\overline{b}_2$ FIG. 23 shows a block diagram of an example of a system in which various aspects and embodiments may be implemented It is to be noted that the drawings illustrate example embodiments and that the embodiments of the present disclosure are not limited to the illustrated embodiments.

5. DETAILED DESCRIPTION

The present detailed description illustrates the principles of the present embodiments. It will thus be appreciated that those skilled in the art will be able to devise various arrangements that, although not explicitly described or shown herein, embody the principles of the present embodiments and are included within its scope.

All examples and conditional language recited herein are intended for educational purposes to aid the reader in understanding the principles of the present embodiments and the concepts contributed by the inventor to furthering the art, and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, that is, any elements developed that perform the same function, regardless of structure.

Thus, for example, it will be appreciated by those skilled in the art that the block diagrams presented herein represent conceptual views of illustrative circuitry embodying the principles of the present embodiments. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

The present embodiments are described more fully hereinafter with reference to the accompanying figures, in which examples of said present embodiments are shown. An embodiment may, however, be embodied in many alternate forms and should not be construed as limited to the examples set forth herein. Accordingly, it should be understood that there is no intent to limit embodiments to the particular forms disclosed. On the contrary, the present embodiments are intended to cover all modifications, equivalents, and alternatives falling within the spirit and scope of this application.

When a figure is presented as a flow diagram, it should be understood that it also provides a block diagram of a corresponding apparatus. Similarly, when a figure is presented as a block diagram, it should be understood that it also provides a flow diagram of a corresponding method/process. The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, read only memory (ROM) for storing software, random access memory (RAM), and nonvolatile storage. Other hardware, conventional and/or custom, may also be included. Similarly, any switches shown in the figures are conceptual only. Their function may be carried out through operation of program logic, through dedicated logic, through interaction of program control and dedicated logic, or even manually, the particular technique being selectable by the implementer as more specifically understood from the context.

Similar or same elements of figures are referenced with the same reference numbers. Some figures represent syntax tables widely used in specification of video compression standards for defining the structure of a bitstream that conforms with said video compression standards. In those syntax tables, the term ' . . . ' denotes unchanged portions of the syntax with respect to a well-known definition given in a specification of a video compression standard and removed in the figures to facilitate reading. Bold terms in syntax tables indicate that a value for this term is obtained by parsing a bitstream. The right column of syntax tables indicates the number of bits for encoding a data of a syntax element. For example, u(4) indicates that 4 bits are used for encoding a data, u(8) indicates 8 bits, ae(v) indicates a context adaptive arithmetic entropy coded syntax element.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The present embodiments as defined by such claims reside in the fact that the functionalities provided by the various recited means are combined and brought together in the manner which the claims call for. It is thus regarded that any means that can provide those functionalities are equivalent to those shown herein.

It is to be understood that the figures and descriptions have been simplified to illustrate elements that are relevant for a clear understanding of the present embodiments, while eliminating, for purposes of clarity, many other elements found in typical encoding and/or decoding devices.

It will be understood that, although the terms first and second may be used herein to describe various elements, these elements should not be limited by these terms. These terms are only used to distinguish one element from another. Various methods are described above, and each of the methods comprises one or more steps or actions for achieving the described method.

Unless a specific order of steps or actions is required for proper operation of the method, the order and/or use of specific steps and/or actions may be modified or combined.

In the following sections, the word "reconstructed" and "decoded" may be used interchangeably. Usually but not necessarily "reconstructed" is used on the encoder side while "decoded" is used on the decoder side. Also, the words "coded" and "encoded" may be used interchangeably. Moreover, the words "image", "picture" and "frame" may be used interchangeably. Furthermore, the words "coding", "source coding" and "compression" may be used interchangeably.

It is to be understood that reference to "one embodiment" or "an embodiment" or "one implementation" or "an implementation" of the present disclosure, as well as other variations thereof, mean that a particular feature, structure, characteristic, and so forth described in connection with the embodiment is included in at least one embodiment of the present disclosure. Thus, the appearances of the phrase "in one embodiment" or "in an embodiment" or "in one implementation" or "in an implementation", as well any other variations, appearing in various places throughout the specification are not necessarily all referring to the same embodiment.

Additionally, the present embodiments or its claims may refer to "determining" various pieces of information. Determining, deriving, the information may include one or more of, for example, estimating the information, calculating the information, predicting the information, or retrieving the information from memory. Also, the application or its claims may refer to "providing" various pieces of information. Providing the information may include one or more of, for example, outputting the information, storing the information, transmitting the information, sending the information, displaying the information, showing the information, or moving the information. Moreover, the application or its claims or its claims may refer to "accessing" various pieces of information. Accessing the information may include one or more of, for example, receiving the information, retrieving the information (for example, from memory), storing the information, processing the information, moving the information, copying the information, erasing the information, calculating the information, determining the information, predicting the information, or estimating the information. Further, the application or its claims may refer to "receiving" various pieces of information. Receiving is, as with "accessing", intended to be a broad term. Receiving the information may include one or more of, for example, accessing the information, or retrieving the information (for example, from memory). Further, "receiving" is typically involved, in one way or another, during operations such as, for example, storing the information, processing the information, transmitting the information, moving the information, copying the information, erasing the information, calculating the information, determining the information, predicting the information, or estimating the information.

It is to be appreciated that the various features shown and described are interchangeable. Unless otherwise indicated, a feature shown in one embodiment may be incorporated into another embodiment. Further, the features described in the various embodiments may be combined or separated unless otherwise indicated as inseparable or not combinable.

As noted before, the functions of the various elements shown in the figures may be provided through the use of dedicated hardware as well as hardware capable of executing software in association with appropriate software. Also, when provided by a processor, the functions may be provided by a single dedicated processor, by a single shared processor, or by a plurality of individual processors, some of which may be shared.

It is to be further understood that, because some of the constituent system components and methods depicted in the accompanying drawings are preferably implemented in software, the actual connections between the system components or the process function blocks may differ depending upon the manner in which the processes of present disclosure are programmed. Given the teachings herein, one of ordinary skill in the pertinent art will be able to contemplate these and similar implementations or configurations of the present disclosure.

Although the illustrative embodiments have been described herein with reference to the accompanying drawings, it is to be understood that the present disclosure is not limited to those precise embodiments, and that various changes and modifications may be effected therein by one of ordinary skill in the pertinent art without departing from the scope of the present disclosure. In addition, individual embodiments can be combined, without departing from the scope of the present disclosure. All such changes and modifications are intended to be included within the scope of the present disclosure as set forth in the appended claims.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

As will be evident to one of skill in the art, implementations may produce a variety of signals formatted to carry information that may be, for example, stored or transmitted. The information may include, for example, instructions for performing a method, or data produced by one of the described implementations. For example, a signal may be formatted to carry the bitstream of a described embodiment. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

It is to be understood that a picture (also denotes image or frame) may be an array of luma samples in monochrome format, or an array of luma samples and two corresponding arrays of chroma samples in 4:2:0, 4:2:2, or 4:4:4 color format or three arrays of three color components (e.g. RGB).

In video compression standard, a picture is partitioned into blocks, possibly of different size and/or different shape. It is to be understood that a block is a two-dimensional array or matrix. The horizontal or x direction (or axis) represents a width and the vertical or y direction (or axis) represents a height. The indexes start at 0. The x direction represents columns and the y direction represents rows. The maximum x index is the width−1. The maximum y index is the height−1.

Encoding

Figure 1:
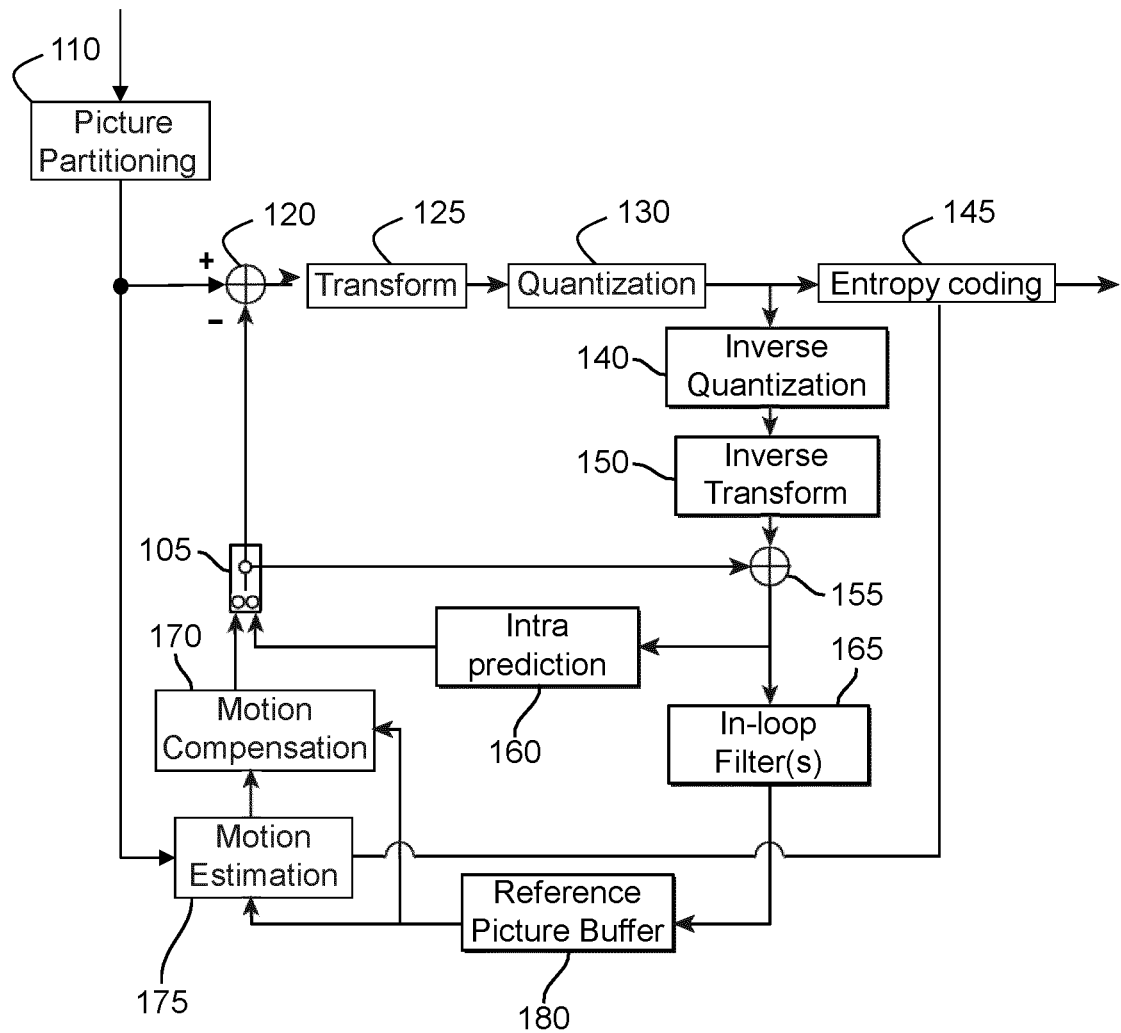
FIG. 1 shows a simplified block diagram of an exemplary encoder in accordance with at least one embodiment.

FIG. 1 illustrates a simplified block diagram of exemplary encoder 100 in accordance with at least one embodiment. The encoder 100 may be included in a transmitter or head-end in a communication system.

To encode a video sequence with one or more pictures, a picture is partitioned into blocks of possibly different size and/or different shape (module 110). For example, in HEVC ("*ITU-T H.265 TELECOMMUNICATION STANDARDIZATION SECTOR OF ITU* (October 2014), *SERIES H: AUDIOVISUAL AND MULTIMEDIA SYSTEMS, Infrastructure of audiovisual services—Coding of moving video, High efficiency video coding, Recommendation ITU-TH.265*"), a picture may be partitioned into CTUs (Coding Tree Units) of square shape with a configurable size. A consecutive set of CTUs may be grouped into a slice. A CTU is the root of a quad-tree partitioning into Coding Units (CUs).

In the exemplary encoder 100, a picture is encoded by block-based encoding modules as described below. Each block is encoded using either an intra-prediction mode or inter-prediction mode. When a block is encoded in an intra-prediction mode (module 160), the encoder 100 performs intra-prediction (also denoted spatial prediction), based on at least one sample of one block in the same picture (or on a pre-defined value for the first block of the picture or slice). As an example, a prediction block is obtained by intra-predicting a block from reconstructed neighboring samples.

When a block is encoded in an inter-prediction mode, the encoder 100 performs inter-prediction (also denoted temporal prediction), based on at least one reference block of at least one reference picture or slice (stored in the reference picture buffer).

Inter-prediction coding is performed by performing motion-estimation (module 175) and motion-compensating (module 170) a reference block stored in a reference picture buffer 180. In uni-inter-prediction (a.k.a. uni-directional prediction) mode, the prediction block may be generally (but not necessarily) based on an earlier reference picture. In bi-inter-prediction (a.k.a. bi-prediction) mode, the prediction block may be generally (but not necessarily) based on an earlier and a later picture.

The encoder 100 decides (module 105) which one of the intra-prediction mode or inter-prediction mode to use for encoding a block and indicates the intra/inter decision by a prediction mode syntax element.

A prediction residual block is calculated by subtracting (module 120) the prediction block (also known as a predictor) from the block. The prediction residual block is transformed (module 125) and quantized (module 130). The transform module 125 may transform the prediction residual block from the pixel (spatial) domain to the transform (frequency) domain. The transform may be, for example, a cosine transform, a sine transform, a wavelet transform, etc. Quantization (module 130) may be performed according to, for example, a rate distortion criterion.

The quantized transform coefficients, as well as motion vectors and other syntax elements, are entropy coded (module 145) to output a bitstream. The entropy coding may be, for example, Context Adaptive Binary Arithmetic Coding (CABAC), Context Adaptive Variable Length Coding (CAVLC), Huffman, arithmetic, exp-Golomb, etc.

The encoder may also skip the transform and apply quantization directly to the non-transformed prediction residual block. The encoder may also bypass both transform and quantization, that is the prediction residual block is coded directly without the application of the transform or quantization process.

In direct PCM coding, no prediction is applied and the block samples are directly coded into the bitstream.

The encoder 100 comprises a decoding loop and thus decodes an encoded block to provide a reference for further predictions. The quantized transform coefficients are de-quantized (a.k.a. inverse quantization) (module 140) and inverse transformed (module 150) to decode prediction residual blocks. A block is then reconstructed by combining (module 155) the decoded prediction residual block and the prediction block. One or more in-loop filters (165) may be applied to the reconstructed picture, for example, to perform deblocking/Sample Adaptive Offset (SAO) filtering to reduce coding artifacts. The filtered picture is stored in the reference picture buffer 180.

The modules of encoder 100 may be implemented in software and executed by a processor or may be implemented using circuit components well-known by one skilled in the art of compression. In particular, video encoder 100 may be implemented as an integrated circuit (IC).

Decoding

Figure 2:
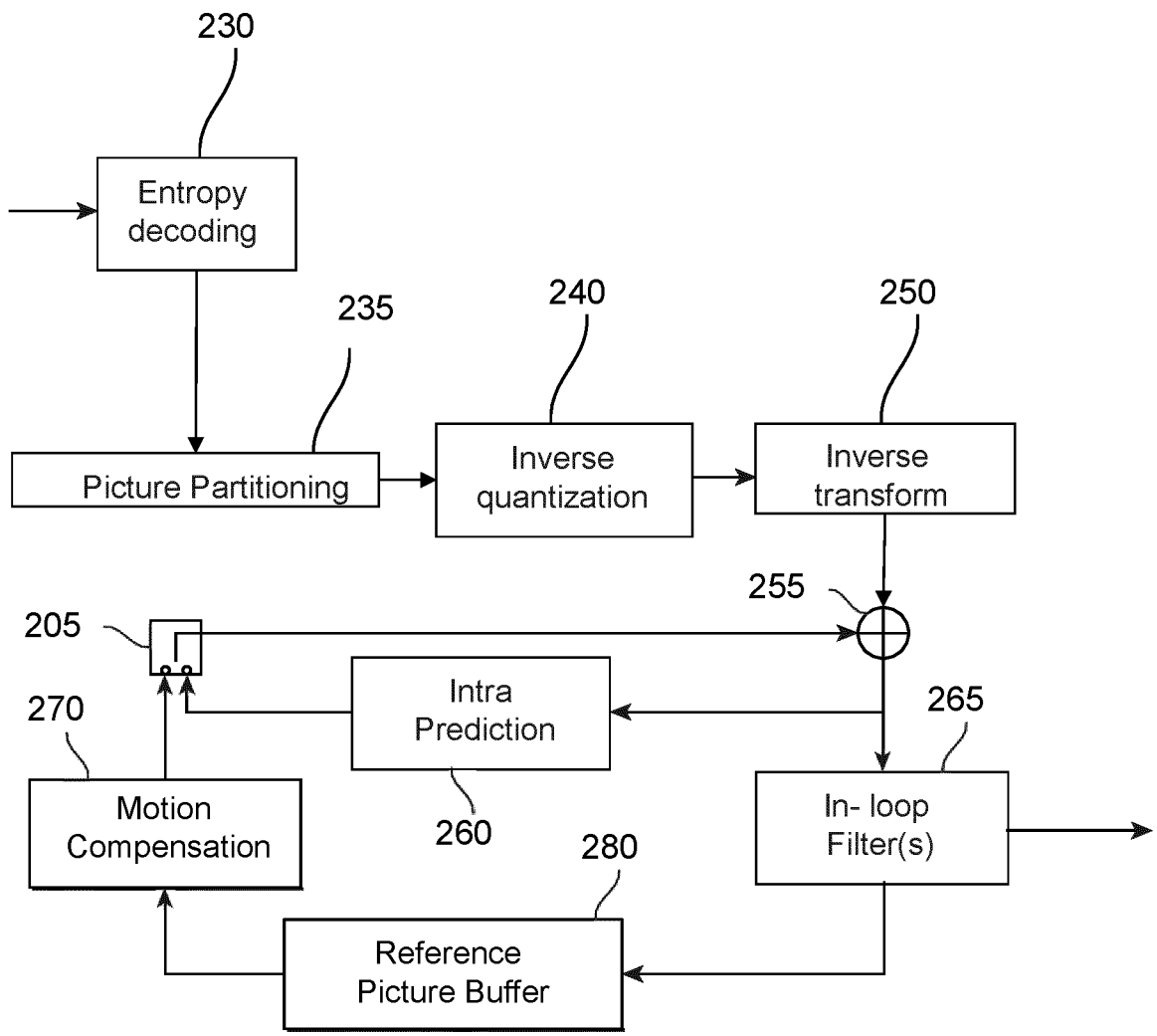
FIG. 2 shows a simplified block diagram of an exemplary decoder in accordance with at least one embodiment.

FIG. 2 illustrates a simplified block diagram of an exemplary decoder 200 in accordance with at least one embodiment. The decoder 200 may be included in a receiver in a communication system. The decoder 200 generally performs a decoding pass reciprocal to the encoding pass performed by the encoder 100 as described in FIG. 1, although not all operations in the decoder are inverse operations of the encoding process (for example intra- and inter-prediction). In particular the input of the decoder 200 includes a video bitstream, which may be generated by the encoder 100.

The video bitstream is first entropy decoded (module 230) to obtain, for example, transform coefficients, motion vectors MV, picture partitioning information, possibly prediction mode flag, syntax elements and other decoding data. For example, in HEVC, the picture partitioning information indicates the size of the CTUs, and a manner a CTU is split into CUs. The decoder may therefore divide (235) the picture into CTUs, and each CTU into CUs, according to the picture partitioning information.

The transform coefficients are de-quantized (module 240) and inverse transformed (module 250) to decode prediction residual blocks. The decoded prediction residual blocks are then combined (module 255) with prediction blocks (also known as a predictor) to obtain decoded/reconstructed blocks.

A prediction block may be obtained (module 205) from intra-prediction (module 260) or motion-compensated prediction (that is, inter-prediction) (module 270) depending, possibly, on prediction mode flag. An in-loop filter (module 265) may be applied to the reconstructed picture. The in-loop filter may comprise a deblocking filter and/or a SAO filter. The filtered picture is stored in a reference picture buffer 280.

The modules of decoder 200 may be implemented in software and executed by a processor or may be implemented using circuit components well-known by one skilled in the art of compression. In particular, decoder 200 may be implemented as an integrated circuit (IC), alone or combined with encoder 100 as a codec.

The present embodiments address intra prediction in Versatile Video Coding (VVC) VTM 5.0. In the JVET meeting held in Geneva in March 2019, it was agreed to use Matrix Intra Prediction (MIP), which is a set of affine transformations for intra prediction. With MIP, the intra prediction in VTM-5.0 is now based on intra prediction with Multiple Reference Lines (MRL), Intra prediction with Sub-Partitions (ISP), the conventional 67 intra predictions modes (planar, DC, and 65 directional modes), and MIP. The present embodiments propose to reduce this set of affine transformations to a single affine transformation. This single affine transformation for intra prediction is denoted herein SMIP. This decreases the memory footprint by a factor of 7.92 on both the encoder and decoder sides.

Figure 3:
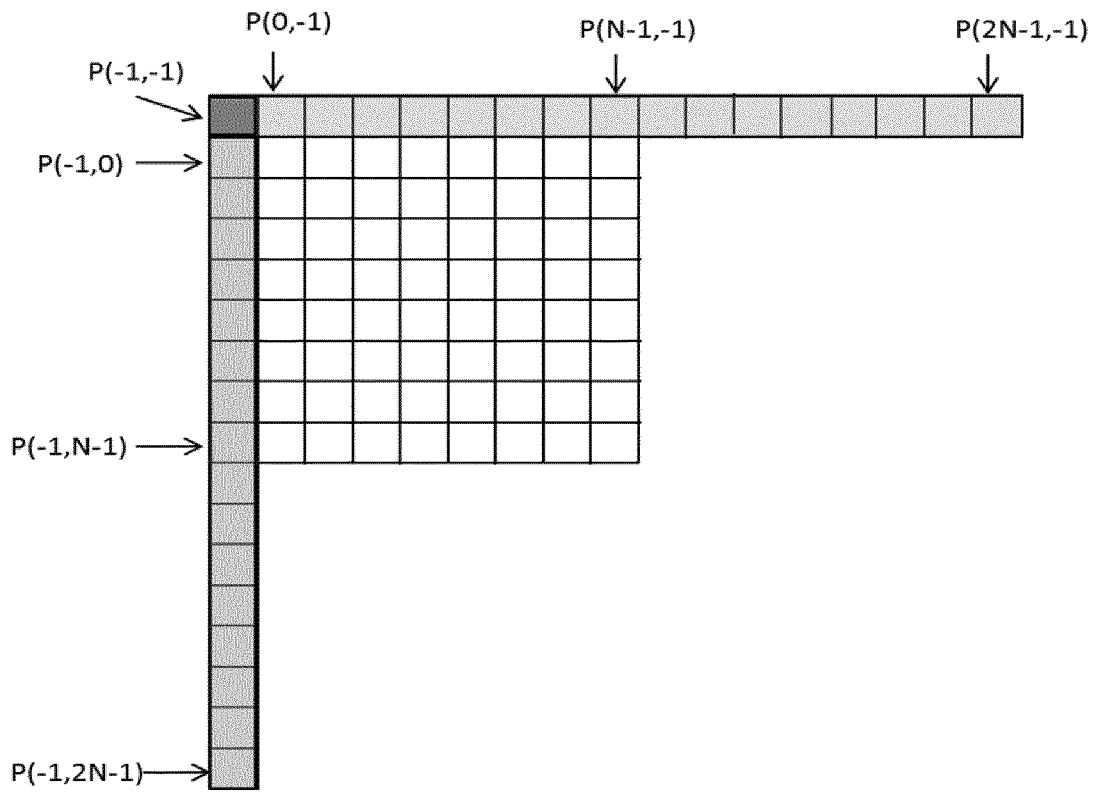
FIG. 3 shows an exemplary reference sample generation process

The intra prediction process in H.266/VVC consists of gathering reference samples, processing them, deriving the actual prediction of the samples of the current block, and finally post-processing the predicted samples. The reference sample generation process is illustrated in FIG. 3. More precisely, FIG. 3 illustrates exemplary reference samples for intra prediction in H.266/VVC in the case of a square current block W=H=N, the pixel values at coordinates (x,y) being indicated in the figure by P(x,y). An array of 2W samples on the top is formed from the previously reconstructed top and top-right pixels to the current block, W denoting the block width. Similarly, a column of 2H samples on the left is formed from the reconstructed left and below left pixels, H denoting the block height. The corner pixel at the top-left position is also used to fill up the gap between the top row and the left column references. If some of the samples on top or left are not available, because of the corresponding Coding Units (CUs) not being in the same slice or the current CU being at a frame boundary, then a method called reference sample substitution is performed where the missing samples are copied from the available samples in a clock-wise direction. Then, depending on the current CU size and the prediction mode, the reference samples are filtered using a specified filter.

Figure 4:
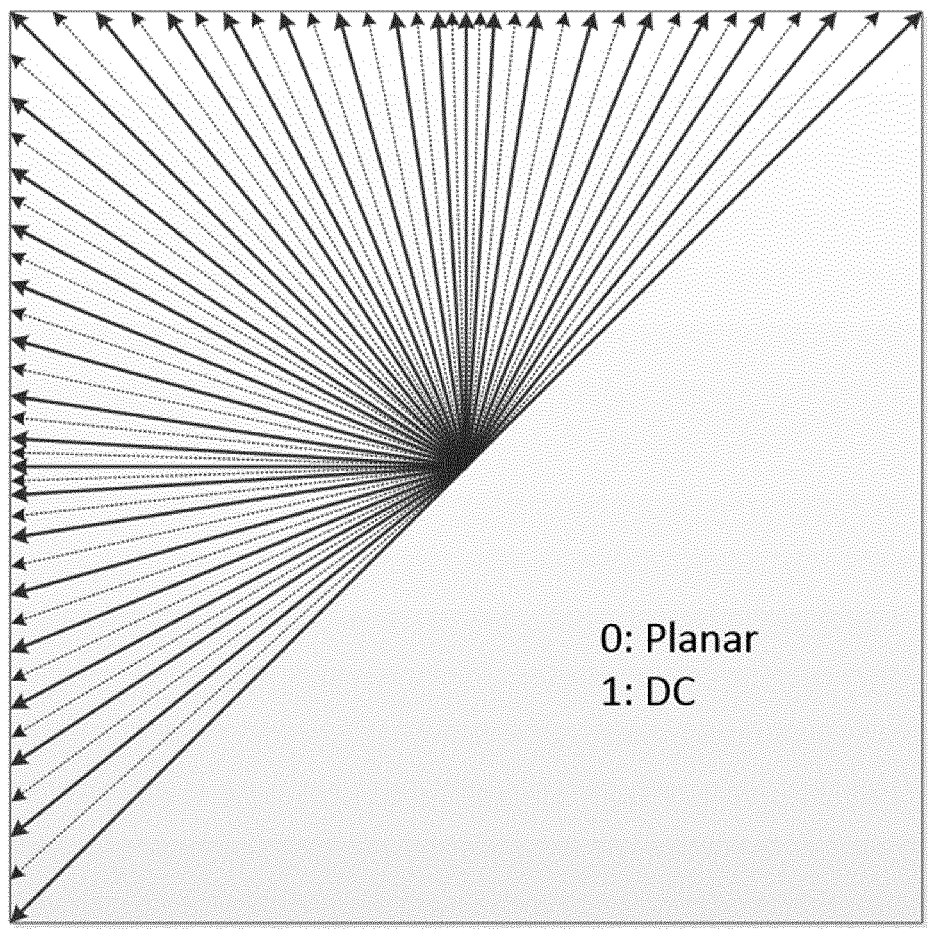
FIG. 4 shows exemplary prediction directions for square blocks.

H.266/VVC includes a range of prediction models derived from those in H.265/HEVC. Planar and DC prediction modes are used to predict smooth and gradually changing regions, whereas angular prediction modes are used to capture different directional structures. There exist 65 directional prediction modes which are organized differently for each rectangular block shape. These prediction modes correspond to different prediction directions as illustrated in FIG. 4. The intra prediction was further expanded with tools such as intra prediction with Multiple Reference Lines (MRL) and Intra prediction with Sub-Partitions (ISP).

On the encoder side, the best intra prediction mode according to a rate-distortion criterion is selected, and its index is transmitted from the encoder to the decoder. To perform the signaling of the selected mode index via entropy coding, a list of Most Probable Modes (MPMs) is built.

Figure 5:
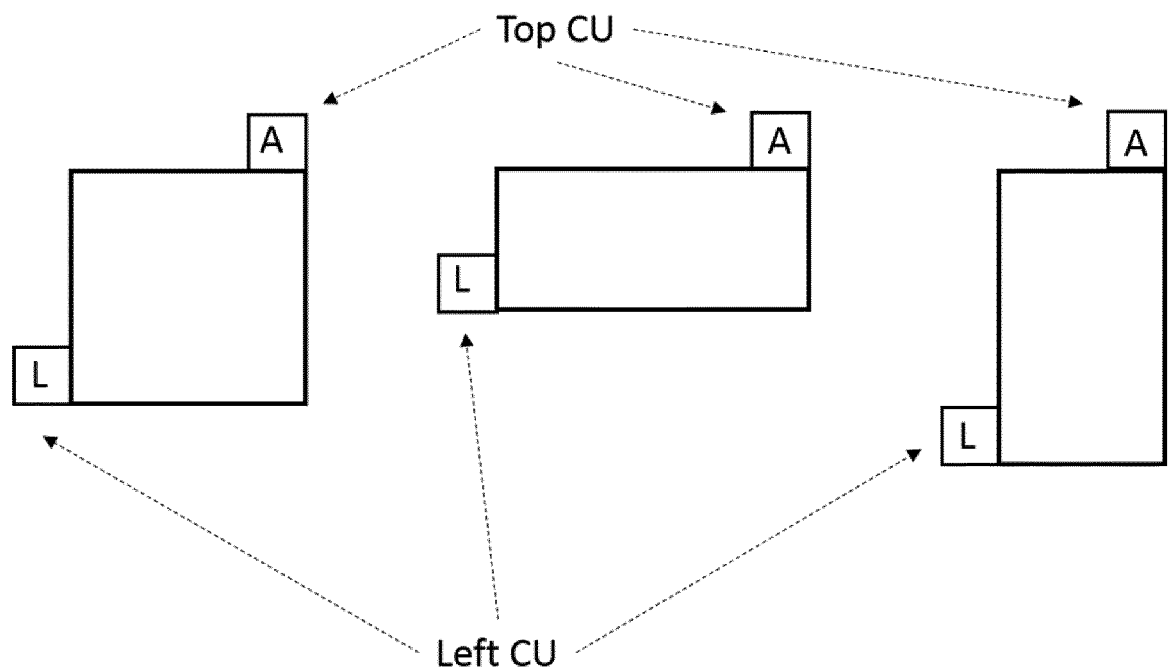
FIG. 5 shows exemplary top and left CU locations for deriving the MPM list in for different block shapes.

In VTM-5.0, a MPM list contains 6 intra prediction modes for signaling the intra prediction mode of the current block [1]. The MPM list is created from the prediction modes of the intra coded CUs on the top and left of the current CU and some default modes. The top and left CUs are at the right and bottom edge of the current block, as shown in FIG. 5.

L≡prediction mode of the left CU (value in range [0-66])
A≡prediction mode of the above CU (value in range [0-66])
  offset=61
  mod=64
Initialization of the MPM List:

---

MPM[0] = PLANAR_IDX
MPM[1] = DC_IDX
MPM[2] = VER_IDX
MPM[3] = HOR_IDX
MPM[4] = VER_IDX − 4
MPM[5] = VER_IDX + 4
Building of the MPM List:
if (L = A)
  if (L > DC_IDX)
    MPM[0] = PLANAR_IDX
    MPM[1] = L
    MPM[2] = ((L + offset) % mod) + 2
    MPM[3] = ((L − 1) % mod) + 2
    MPM[4] = DC_IDX
    MPM[5] = ((L + offset − 1) % mod) + 2
  else
    use initialized values
else
  if ((L > DC_IDX) && (A > DC_IDX))
    MPM[0] = PLANAR_IDX
    MPM[1] = L
    MPM[2] = A
    MPM[3] = DC_IDX
    MPM[4] = ((max(L,A) + offset) % mod) + 2 if L and A are not adjacent
        = ((max(L,A) + offset − 1) % mod) + 2, otherwise
    MPM[5] = ((max(L,A) − 1) % mod) + 2 if L and A are not adjacent
        = ((max(L,A) − 0) % mod) + 2 otherwise
  else if (L + A >= 2)
    MPM[0] = PLANAR_IDX
    MPM[1] = max(L,A)
    MPM[2] = DC_IDX
    MPM[3] = ((max(L,A) + offset) % mod) + 2
    MPM[4] = ((max(L,A) − 1) % mod) + 2
    MPM[5] = ((max(L,A) + offset − 1) % mod) + 2
  else
    use initialized values

---

Using circular adjacency over the range [2-66], it can be equivalently written $$((L+\text{offset})\ \%\ \text{mod})+2 \equiv L-1$$

$$((L+\text{offset}-1)\ \%\ \text{mod})+2 \equiv L-2$$

$$((L-1)\ \%\ \text{mod})+2 \equiv L+1$$

$$((L-0)\ \%\ \text{mod})+2 \equiv L+2$$

Using the above relationships, it can be shown that the MPM list derivation is that in FIG. 6.

In regular intra prediction, if the prediction mode of the current block corresponds to one of the six MPM modes, this is signaled via the mpmFlag with value 1 and then by signaling the candidate mode from the MPM list using the variable length coding scheme shown in FIG. 7. A and L denote in FIG. 7 the predictions modes of above and left CUs respectively. Otherwise, the mpmFlag is equal to 0 and the candidate index in the set of remaining 61 modes is truncated-binary encoded with 5 or 6 bits.

For intra prediction with MRL, the reference line used for the prediction is signaled with a flag multiRefIdx. The valid values of multiRefIdx are 0, 1, and 3, which signal the first, the second, or the fourth reference line. When multiRefIdx is non-zero, (meaning either the second or the fourth reference line is used), the prediction mode always belongs to the MPM list. Thus, the mpmFlag is not signaled. Furthermore, the planar mode is excluded from the list. This means that, when multiRefIdx is non-zero, only five prediction modes are available as possible candidates. When multiRefIdx is non-zero, the prediction mode is signaled as shown in FIG. 8.

For Intra prediction with ISP, the type of partitioning used for the CU is signaled with a flag called ispMode. ispMode is encoded only when multiRefIdx is equal to 0. The valid values of ispMode are 0, 1, and 2, which signal no partitioning, horizontal partitioning, and vertical partitioning respectively. If ispMode is non-zero, i.e. if the target CU is partitioned, then the prediction mode always belongs to the MPM list. Therefore, in this case, the mpmFlag is not signaled. The prediction mode is encoded using FIG. 7.

In the 12$^{th}$ JVET meeting in Macao, it was agreed to integrate the Combined Inter-Intra Prediction (CIIP) in VVC. This tool was then simplified by [3]. In the simplified version of CIIP, the merge mode linearly combines planar and one merge indexed prediction. The intra weight $w_{intra}$ and the inter weight $w_{inter}$ for combining the intra and inter predicted samples depend on the number of neighboring intra-coded blocks. Re-using the notations in FIG. 5,
  if (TopCU and LeftCU are intra-coded)
    $w_{intra}=3$
    $w_{inter}=1$
  else if (either TopCU or LeftCU is intra-coded)
    $w_{intra}=2$
    $w_{inter}=2$
  else
    $w_{intra}=1$
    $w_{inter}=3$ MIP, as adopted in the current version of H.266/VVC, is described in [2]. For MIP, the reference sample generation process consists in taking exclusively the W reconstructed top and H reconstructed left pixels. These reference samples are not filtered. The reference samples are averaged, resulting in a vector of 4 values in the case of W=H=4 and 8 values for bigger blocks. The vector of averaged reference samples is multiplied with a matrix of weights, and a vector of biases is added. Finally, the prediction of the current block is obtained by linearly interpolating the result. The initial reference samples are used for interpolating the boundaries. Three sets $S_0$, $S_1$, $S_2$ of matrices and vectors are available for the encoder to select. For blocks of size 4×4, the set $S_0$ contains 18 matrices and bias vectors of size 16×4 and 16 respectively. For blocks of sizes 4×8, 8×4 and 8×8, $S_1$ consists of 10 matrices of size 16×8 and biases of size 16. Finally, for all other block shapes, the set $S_2$ consists of 7 matrices of size 64×8 and 6 bias vectors of size 64.

Depending on the mode and the block shape, the vector of input, which the authors call bdry$_{red}$ for "reduced boundary", is rearranged as follows:

$$bdry_{red} = \begin{cases} [bdry_{red}^{top}, bdry_{red}^{left}] & \text{for } W = H = 4 \text{ and mode} < 18 \\ [bdry_{red}^{left}, bdry_{red}^{top}] & \text{for } W = H = 4 \text{ and mode} \geq 18 \\ [bdry_{red}^{top}, bdry_{red}^{left}] & \text{for max}(W, H) = 8 \text{ and mode} < 10 \\ [bdry_{red}^{left}, bdry_{red}^{top}] & \text{for max}(W, H) = 8 \text{ and mode} \geq 10 \\ [bdry_{red}^{top}, bdry_{red}^{left}] & \text{for max}(W, H) > 8 \text{ and mode} < 6 \\ [bdry_{red}^{left}, bdry_{red}^{top}] & \text{for max}(W, H) > 8 \text{ and mode} \geq 6. \end{cases}$$

where the averaged boundary samples at the top and at the left are denoted bdry$_{red}^{top}$ and bdry$_{red}^{left}$, respectively, as depicted in FIG. 9.

Then the output reduced set pred$_{red}$ of samples for the predicted blocks is generated as: pred$_{red}$=A·bdry$_{red}$+b.

The matrix of weights A and the offset vector b are selected among the sets $S_0$, $S_1$, $S_2$ depending on the mode and block shape as A=$A_{idx}^m$ where $$idx(W, H) = \begin{cases} 0 & \text{for } W = H = 4 \\ 1 & \text{for } \max(W, H) = 8 \\ 2 & \text{for } \max(W, H) > 8. \end{cases}$$

$$\text{And } m = \begin{cases} \text{mode} & \text{for } W = H = 4 \text{ and mode} < 18 \\ \text{mode} - 17 & \text{for } W = H = 4 \text{ and mode} \geq 18 \\ \text{mode} & \text{for } \max(W, H) = 8 \text{ and mode} < 10 \\ \text{mode} - 9 & \text{for } \max(W, H) = 8 \text{ and mode} \geq 10 \\ \text{mode} & \text{for } \max(W, H) > 8 \text{ and mode} < 6 \\ \text{mode} - 5 & \text{for } \max(W, H) > 8 \text{ and mode} \geq 6. \end{cases}$$

The interpolation processes that are performed on pred$_{red}$ in the case of an 8×8 and 8×4 block are shown in FIG. 10 and FIG. 11 respectively.

For larger blocks, the reference samples are grouped and averaged so that the input vector is 8 samples long, as shown in FIG. 12 for a 16×16 block.

This method requires to store the sets $S_0$, $S_1$, $S_2$ which correspond to
- 18 matrices of size 16×4 and 18 offsets of size 16
- 10 matrices of size 16×8 and 10 offsets of size 16
- 6 matrices of size 64×8 and 6 offsets of size 64 representing 6336 parameters to be coded, which corresponds to 7.92 kilobytes of data when stored as 10-bit values.

A MIP mode is first signaled with a flag called mipFlag, a value of 1 meaning that a MIP mode is used for predicting the current block, and 0 meaning that one of the 67 conventional intra prediction mode is used. When mipFlag is equal to 1, multiRefIdx is necessarily equal to 0, meaning that the first reference line is used, and ispMode is equal to 0, i.e. there is no target CU partition. Therefore, when mipFlag is equal to 1, multiRefIdx and ispMode are not written. If mipFlag is equal to 1, the MIP mode is then signaled via a binary decision tree based on a list of 3 MPMs.

To handle the case where the intra prediction mode for predicting the current block is one of the 67 conventional intra prediction modes and the mode for predicting the CU at the right of the current block or the one for predicting the CU at the bottom-edge of the current block is a MIP mode, a mapping between each MIP mode and one of the conventional modes enables to substitute this MIP mode with its mapped conventional mode. The mapping also enables to substitute the way round, i.e. a conventional mode with its mapped MIP mode.

In the present embodiments, instead of using the set $S_0$ for block size 4×4, a single matrix $M_0$ and bias vector $b_0$ of size 16×4 and 16 respectively are used. Instead of using the set $S_1$ for block sizes 4×8, 8×4 and 8×8, a single matrix $M_1$ and bias vector $b_1$ of size 16×8 and 16 respectively are used. Instead of using the set $S_2$ for all other block shapes, a single matrix $M_2$ and bias vector $b_2$ of size 64×8 and 64 respectively are used. This amount to 800 parameters to be coded, which corresponds to 1.0 kilobyte when stored as 10-bit values.

According to some embodiments, the signaling of SMIP, using some above elements of H.266/VVC can be done via mipFlag, a value of 1 meaning now the single MIP mode. Depending on the shape of the current block, either ($M_0$, $b_0$), ($M_1$, $b_1$) or ($M_2$, $b_2$) is used for predicting the current block.

Now, the above-mentioned mapping boils down to SMIP to planar.

A first variant of the above SMIP signaling is to place mipFlag after mpmFlag and before the bit signaling the first MPM. Now, if mipFlag is equal to 1, the candidate mode is signaled from the MPM list using the variable length coding scheme shown in FIG. 13.

A second variant is to place mipFlag after the bit signaling the first MPM and before the bit signaling the second MPM. Now, if mipFlag is equal to 1, the candidate mode is signaled from the MPM list using the variable length coding scheme shown in FIG. 14.

In a third variant, instead of using mipFlag, SMIP can be put into the MPM list, before DC. The MPM derivation becomes the one described in FIG. 15.

In a fourth variant, instead of using mipFlag, SMIP can also be put into the MPM list, after DC. The MPM derivation becomes the one described in FIG. 16.

In a fifth variant, mipFlag is not used, as explained above (third and fourth variants). SMIP replaces planar, meaning that SMIP has the signaling of planar.

In a sixth variant, mipFlag is not used, as explained above (third, fourth and fifth variants), and SMIP replaces DC, meaning that SMIP owns the signaling of DC.

A seventh variant can be combined with any variant of the above SMIP signaling. On the encoder side, when SMIP is selected as intra prediction mode for predicting the current block, Multiple Transform Selection (MTS) and/or Non Separable Secondary Transform (NSST) transforms can be deactivated, implying that, for the deactivated transforms, the signaling flags are not written to the bitstream. On the decoder side, after decoding the signaling flags for intra prediction, if SMIP is selected as intra prediction mode for prediction the current block, there is no decoding of the flags of the deactivated transforms.

Planar, which is the unique intra prediction mode systematically used in the simplified version of CIIP described above, can be replaced by SMIP.

As SMIP has few parameters (800), these parameters can be learned online (e.g. when encoding the frame) and sent. More precisely, on the encoder side, for each group of n frames, the parameters of SMIP can be first learned on pairs (decoded reference samples, block) extracted from the n luminance channels. Then, the learned parameters are encoded. Finally, the group of n frames is encoded using the learned parameters. On the decoder side, for each group of n frames, the parameters of SMIP are first decoded. Then, this group is decoded using the learned parameters.

The training method for SMIP described below can applied to either an online training, as described above, or an offline training. The training method for SMIP is described in link with FIG. 17 that shows an exemplary graph for predicting the current block Y from its neighboring reference samples via SMIP and each of the 67 conventional intra prediction mode in H.266/VVC for 4×4 blocks (the generalization to 8×8 blocks and 16×16 blocks is straightforward). According to some embodiments of the present disclosure, each pair of weight matrix and bias vector ($M_i$, $b_i$), i⟦ 0, ⟧ , is trained in collaboration with the conventional intra prediction modes in H.266/VVC by defining the graph in FIG. 17 and minimizing an objective function over the weight matrix $M_i$ and the bias vector $b_i$ via backpropagation. The diagram component called "SMIP prediction" is the averaging, affine transformation, and linear interpolation depicted in FIG. 9, FIG. 10 or FIG. 12, depending on the block size for which the weight matrix and the bias vector are being learned. The diagram component called "conventional prediction" is the prediction via each of the 67 conventional intra prediction in H.266/VVC, displayed in FIG. 18. FIG. 18 shows an exemplary prediction of the current block Y via each of the 67 intra prediction mode in H.266/VVC for 4×4 blocks (the generalization to 8×8 blocks and 16×16 blocks is straightforward) In FIG. 18, the reference samples are vectorized. Then, the prediction of the mode of index i is expressed as a dot product between the vector of reference samples and the mode matrix $U_i$, i=DC, planar, 2, 3, . . . , 66. The mode prediction as dot product is suitable for the graph formalism for training. As an example, for 4×4 blocks $U_2$, $U_{18}$, $U_{34}$, and $U_{50}$ are depicted in FIG. 19.

During training, the SMIP prediction is clipped, as shown in FIG. 17. As the pixel intensity of all pairs (reference samples, block) for training are normalized from $[\![0, 1023]\!]$ to $[-1.0, 1.0]$, the minimum value for clipping is $-1.0$ and the maximum value is $1.0$. During backpropagation, the gradient of the output of the clipping function with respect to its input is replaced by the gradient of the identity, i.e. the constant function $f(x)=1, \forall x \in \mathbb{R}$. To simulate during training the intra fast selection process in H.266/VVC, the objective function to be minimized over the weight matrix $M_i$ and bias vector $b_i$, $i \in [\![0, 2]\!]$, combines the SAD between the current block Y and each mode prediction and each mode estimated signaling cost (see Equation (1): minimization for learning ($M_i$, $b_i$)).

$$\min_{M_i, b_i} \mathbb{E}\left[\sum_{j \in S} \text{smoothmin}(\varepsilon_{DC}, \varepsilon_{planar}, \varepsilon_2, \varepsilon_3, \ldots, \varepsilon_{66}, \varepsilon_{SMIP}, \sigma)_j\right], \varepsilon_j = 511.5\|Y-\text{pred}_j\|_1 + \gamma c_j, j \in S$$

$$S = \{DC, planar, 2, 3, \ldots, 66, SMIP\} \quad (1)$$

The factor 511.5 compensates for the above-mentioned normalization of the pixel intensity from $[\![0, 1023]\!]$ to $[-1.0, 1.0]$ during training.

In the above minimization, the expectation is estimated via an average over all pairs (reference samples, block) for training.

$c_j = \alpha_j (1 << 15)$ is the estimated signaling cost of the mode of index j.

$\alpha_{planar} = 2$
$\alpha_{DC} = 3$
$\alpha_2 = \alpha_{18} = \alpha_{50} = \alpha_{66} = 5$
$\alpha_k = 7$, $k \in [\![2, 66]\!] \setminus \{2, 18, 50, 66\}$
$\alpha_{SMIP} = 1$
$\gamma = 0.001$ $$\text{smoothmin}(\varepsilon_{DC}, \varepsilon_{planar}, \varepsilon_2, \varepsilon_3, \ldots, \varepsilon_{66}, \varepsilon_{SMIP}, \sigma)_j = \frac{\varepsilon_j \exp(\sigma \varepsilon_j)}{\sum_{k \in S} \exp(\sigma \varepsilon_k)},$$

$$\sigma \in \mathbb{R}^-$$

$\sigma$ is smoothly decreased from 0 to $-10.0$ as the training advances.

After running the above-mentioned training algorithm, the learned biases are transformed via Equation (2)(transformation of the learned biases for compensating the normalization of pixel intensity during training) to compensate for the above-mentioned normalization of the pixel intensity from $[\![0, 102]\!]$ to $[-1.0, 1.0]$ which applies during the training phase, but not during the test phase inside H.266/VVC.

$$b_{i,j} \leftarrow 511.5(-\Sigma_k M_{i,jk} + b_{i,j} + 1.0) \quad (2)$$

$M_{i,kj}$ denotes the coefficient at position (j, k) in the weight matrix $M_i$.

$b_{i,j}$ denotes the coefficient at position j in the bias vector $b_i$.

Then, each learned weight is multiplied by $\beta = 1 << p$, where $p \in \mathbb{N}^*$ depends on the bit-shifts involved in the SMIP affine transformation at test time inside H.266/VVC. Finally, the resulting weights and biases are all rounded to the nearest integer, yielding the quantized weight matrix $\overline{M}_i$ and the quantized bias vector $\overline{b}_i$.

After the above-mentioned training method, $\overline{M}_0$ and $\overline{b}_0$ are displayed in FIG. 20, $\overline{M}_1$ and $\overline{b}_1$ are displayed in FIG. 21, $\overline{M}_2$ and $\overline{b}_2$ are displayed in FIG. 22.

FIG. 23 illustrates a block diagram of an example of a system in which various aspects and embodiments are implemented. System 2300 can be embodied as a device including the various components described below and is configured to perform one or more of the aspects described in this document. Examples of such devices include, but are not limited to, various electronic devices such as personal computers, laptop computers, smartphones, tablet computers, digital multimedia set top boxes, digital television receivers, personal video recording systems, connected home appliances, and servers. Elements of system 2300, singly or in combination, can be embodied in a single integrated circuit (IC), multiple ICs, and/or discrete components. For example, in at least one embodiment, the processing and encoder/decoder elements of system 2300 are distributed across multiple ICs and/or discrete components. In various embodiments, the system 2300 is communicatively coupled to one or more other systems, or other electronic devices, via, for example, a communications bus or through dedicated input and/or output ports. In various embodiments, the system 2300 is configured to implement one or more of the aspects described in this document.

The system 2300 includes at least one processor 2310 configured to execute instructions loaded therein for implementing, for example, the various aspects described in this document. Processor 2310 can include embedded memory, input output interface, and various other circuitries as known in the art. The system 2300 includes at least one memory 2320 (e.g., a volatile memory device, and/or a non-volatile memory device). System 2300 includes a storage device 2340, which can include non-volatile memory and/or volatile memory, including, but not limited to, Electrically Erasable Programmable Read-Only Memory (EEPROM), Read-Only Memory (ROM), Programmable Read-Only Memory (PROM), Random Access Memory (RAM), Dynamic Random Access Memory (DRAM), Static Random Access Memory (SRAM), flash, magnetic disk drive, and/or optical disk drive. The storage device 2340 can include an internal storage device, an attached storage device (including detachable and non-detachable storage devices), and/or a network accessible storage device, as non-limiting examples.

System 2300 includes an encoder/decoder module 2330 configured, for example, to process data to provide an encoded video or decoded video, and the encoder/decoder module 2330 can include its own processor and memory. The encoder/decoder module 2330 represents module(s) that can be included in a device to perform the encoding and/or decoding functions. As is known, a device can include one or both of the encoding and decoding modules. Additionally, encoder/decoder module 2330 can be implemented as a separate element of system 2300 or can be incorporated within processor 2310 as a combination of hardware and software as known to those skilled in the art. Program code to be loaded onto processor 2310 or encoder/decoder 2330 to perform the various aspects described in this document can be stored in storage device 2340 and subsequently loaded onto memory 2320 for execution by processor 2310. In accordance with various embodiments, one or more of processor 2310, memory 2320, storage device 2340, and encoder/decoder module 2330 can store one or more of various items during the performance of the processes described in this document. Such stored items can include, but are not limited to, the input video, the decoded video or portions of the decoded video, the bitstream, matrices, variables, and intermediate or final results from the processing of equations, formulas, operations, and operational logic.

In some embodiments, memory inside of the processor 2310 and/or the encoder/decoder module 2330 is used to store instructions and to provide working memory for processing that is needed during encoding or decoding. In other embodiments, however, a memory external to the processing device (for example, the processing device can be either the processor 2310 or the encoder/decoder module 2330) is used for one or more of these functions. The external memory can be the memory 2320 and/or the storage device 2340, for example, a dynamic volatile memory and/or a non-volatile flash memory. In several embodiments, an external non-volatile flash memory is used to store the operating system of, for example, a television. In at least one embodiment, a fast external dynamic volatile memory such as a RAM is used as working memory for video coding and decoding operations, such as for MPEG-2 (MPEG refers to the Moving Picture Experts Group, MPEG-2 is also referred to as ISO/IEC 13818, and 13818-1 is also known as H.222, and 13818-2 is also known as H.262), HEVC (HEVC refers to High Efficiency Video Coding, also known as H.265 and MPEG-H Part 2), or VVC (Versatile Video Coding, a new standard being developed by JVET, the Joint Video Experts Team).

The input to the elements of system 2300 can be provided through various input devices as indicated in block 2330. Such input devices include, but are not limited to, (i) a radio frequency (RF) portion that receives an RF signal transmitted, for example, over the air by a broadcaster, (ii) a Component (COMP) input terminal (or a set of COMP input terminals), (iii) a Universal Serial Bus (USB) input terminal, and/or (iv) a High Definition Multimedia Interface (HDMI) input terminal. Other examples, not shown in FIG. 23, include composite video.

In various embodiments, the input devices of block 2430 have associated respective input processing elements as known in the art. For example, the RF portion can be associated with elements suitable for (i) selecting a desired frequency (also referred to as selecting a signal, or band-limiting a signal to a band of frequencies), (ii) down-converting the selected signal, (iii) band-limiting again to a narrower band of frequencies to select (for example) a signal frequency band which can be referred to as a channel in certain embodiments, (iv) demodulating the down-converted and band-limited signal, (v) performing error correction, and (vi) demultiplexing to select the desired stream of data packets. The RF portion of various embodiments includes one or more elements to perform these functions, for example, frequency selectors, signal selectors, band-limiters, channel selectors, filters, downconverters, demodulators, error correctors, and demultiplexers. The RF portion can include a tuner that performs various of these functions, including, for example, down-converting the received signal to a lower frequency (for example, an intermediate frequency or a near-baseband frequency) or to baseband. In one set-top box embodiment, the RF portion and its associated input processing element receives an RF signal transmitted over a wired (for example, cable) medium, and performs frequency selection by filtering, down-converting, and filtering again to a desired frequency band. Various embodiments rearrange the order of the above-described (and other) elements, remove some of these elements, and/or add other elements performing similar or different functions. Adding elements can include inserting elements in between existing elements, such as, for example, inserting amplifiers and an analog-to-digital converter. In various embodiments, the RF portion includes an antenna.

Additionally, the USB and/or HDMI terminals can include respective interface processors for connecting system 2300 to other electronic devices across USB and/or HDMI connections. It is to be understood that various aspects of input processing, for example, Reed-Solomon error correction, can be implemented, for example, within a separate input processing IC or within processor 2310 as necessary. Similarly, aspects of USB or HDMI interface processing can be implemented within separate interface ICs or within processor 2310 as necessary. The demodulated, error corrected, and demultiplexed stream is provided to various processing elements, including, for example, processor 2310, and encoder/decoder 2330 operating in combination with the memory and storage elements to process the data stream as necessary for presentation on an output device.

Various elements of system 2300 can be provided within an integrated housing, within the integrated housing, the various elements can be interconnected and transmit data therebetween using suitable connection arrangement, for example, an internal bus as known in the art, including the Inter-IC (I2C) bus, wiring, and printed circuit boards.

The system 2300 includes communication interface 2350 that enables communication with other devices via communication channel 2360. The communication interface 2350 can include, but is not limited to, a transceiver configured to transmit and to receive data over communication channel 2360. The communication interface 2350 can include, but is not limited to, a modem or network card and the communication channel 2360 can be implemented, for example, within a wired and/or a wireless medium.

Data is streamed, or otherwise provided, to the system 2300, in various embodiments, using a wireless network such as a Wi-Fi network, for example IEEE 802.11 (IEEE refers to the Institute of Electrical and Electronics Engineers). The Wi-Fi signal of these embodiments is received over the communications channel 2360 and the communications interface 2350 which are adapted for Wi-Fi communications. The communications channel 2360 of these embodiments is typically connected to an access point or router that provides access to external networks including the Internet for allowing streaming applications and other over-the-top communications. Other embodiments provide streamed data to the system 2300 using a set-top box that delivers the data over the HDMI connection of the input block 2330. Still other embodiments provide streamed data to the system 2300 using the RF connection of the input block 2330. As indicated above, various embodiments provide data in a non-streaming manner. Additionally, various embodiments use wireless networks other than Wi-Fi, for example a cellular network or a Bluetooth network.

The system 2300 can provide an output signal to various output devices, including a display 2400, speakers 2310, and other peripheral devices 2420. The display 2400 of various embodiments includes one or more of, for example, a touchscreen display, an organic light-emitting diode (OLED) display, a curved display, and/or a foldable display.

The display 2400 can be for a television, a tablet, a laptop, a cell phone (mobile phone), or other device. The display 2400 can also be integrated with other components (for example, as in a smart phone), or separate (for example, an external monitor for a laptop). The other peripheral devices 2420 include, in various examples of embodiments, one or more of a stand-alone digital video disc (or digital versatile disc) (DVR, for both terms), a disk player, a stereo system, and/or a lighting system. Various embodiments use one or more peripheral devices 2420 that provide a function based on the output of the system 2300. For example, a disk player performs the function of playing the output of the system 2300.

In various embodiments, control signals are communicated between the system 2300 and the display 2400, speakers 2410, or other peripheral devices 2420 using signaling such as AV.Link, Consumer Electronics Control (CEC), or other communications protocols that enable device-to-device control with or without user intervention. The output devices can be communicatively coupled to system 2300 via dedicated connections through respective interfaces 2370, 2380, and 2390. Alternatively, the output devices can be connected to system 2300 using the communications channel 2360 via the communications interface 2350. The display 2400 and speakers 2410 can be integrated in a single unit with the other components of system 2300 in an electronic device such as, for example, a television. In various embodiments, the display interface 2370 includes a display driver, such as, for example, a timing controller (T Con) chip.

The display 2400 and speaker 2410 can alternatively be separate from one or more of the other components, for example, if the RF portion of input 2430 is part of a separate set-top box. In various embodiments in which the display 2400 and speakers 2410 are external components, the output signal can be provided via dedicated output connections, including, for example, HDMI ports, USB ports, or COMP outputs.

The implementations described herein may be implemented in, for example, a method or a process, an apparatus, a software program, a data stream, or a signal. Even if only discussed in the context of a single form of implementation (for example, discussed only as a method), the implementation of features discussed may also be implemented in other forms (for example, an apparatus or program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processors also include communication devices, such as, for example, computers, cell phones, portable/personal digital assistants (PDAs), and other devices that facilitate communication of information between end-users.

According to an aspect of the present embodiments, an apparatus 2100 for video encoding and/or decoding is provided, the apparatus including a processor 2310, and at least one memory 2320, 2340 coupled to the processor, the processor 2310 being configured to perform any of the embodiments of the methods described above.

As will be evident to one of skill in the art, implementations may produce a variety of signals formatted to carry information that may be, for example, stored or transmitted. The information may include, for example, instructions for performing a method, or data produced by one of the described implementations. For example, a signal may be formatted to carry the bitstream of a described embodiment. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

Moreover, any of the methods may be implemented as a computer program product (independently or jointly) comprising computer executable instructions which may be executed by a processor. The computer program product having the computer-executable instructions may be stored in the respective transitory or non-transitory computer-readable storage media of the system 2300, encoder 100 and/or decoder 200.

It is important to note that one or more of the elements in the processes may be combined, performed in a different order, or excluded in some embodiments while still implementing the aspects of the present disclosure. Other steps may be performed in parallel, where the processor does not wait for a full completion of a step before starting another.

Furthermore, aspects of the present embodiments can take the form of a computer-readable storage medium. Any combination of one or more computer-readable storage medium(s) may be utilized. A computer-readable storage medium can take the form of a computer-readable program product embodied in one or more computer-readable medium(s) and having computer-readable program code embodied thereon that is executable by a computer. A computer-readable storage medium as used herein is considered a non-transitory storage medium given the inherent capability to store the information therein as well as the inherent capability to provide retrieval of the information therefrom. A computer-readable storage medium may be, for example, but is not limited to, an electronic, magnetic, optical, electromagnetic, infrared, or semiconductor system, apparatus, or device, or any suitable combination of the foregoing.

It is to be appreciated that the following list, while providing more specific examples of computer-readable storage mediums to which the present disclosure may be applied, is merely an illustrative and not exhaustive listing as is readily appreciated by one of ordinary skill in the art. The list of examples includes a portable computer diskette, a hard disk, a ROM, EPROM, Flash memory, a portable compact disc read-only memory (CD-ROM), an optical storage device, a magnetic storage device, or any suitable combination of the foregoing.

According to an aspect of the present embodiments, a computer-readable storage medium carrying a software program is provided including program code instructions for performing any of the embodiments of any of the methods of the present embodiments, including the above methods.

As detailed above, in the present disclosure, some aspects relate to a device comprising at least one processor adapted for encoding image data, said at least one processor being adapted for, or a method for encoding image data, the method comprising, intra-predicting at least one first block of said image data by using an intra-prediction mode using a first single transformation, said first single transformation being obtained by taking account of said first block size. The image data can be an image frame for instance. According to some embodiments, said intra-prediction mode uses said first single transformation for predicting blocks of said image data having said first block size. According to some embodiments, said first single transformation is obtained from a set comprising a single matrix and a single bias vector. According to some embodiments, said intra-prediction mode uses a second single transformation for intra-predicting a second block of said image data having a size different than said first block size.

According to some embodiments, when said block size is 4×4 pixels, said single matrix has a size of 16×4 pixels and/or said single vector has a size of 16 pixels. According to some embodiments, when said block size is 4×8 pixels, 8×4 pixels or 8×8 pixels, said single matrix has a size of 16×8 pixels and/or said single vector has a size of 16 pixels. According to some embodiments, when said block size is other than 4×4 pixels 4×8 pixels, 8×4 pixels or 8×8 pixels, said single matrix has a size of 64×8 pixels and/or said single vector has a size of 64 pixels.

According to some embodiments, the at least one processor is adapted for, or the method comprises, encoding an information signaling a use of said intra-prediction mode is a bitstream. According to some embodiments, a variable coding length is used for signaling a plurality of Prediction Modes (MPM) in said bitstream, said variable coding length ordering said prediction modes, and said information is encoded as one of said plurality of Prediction Modes. According to some embodiments, said plurality of Prediction Modes contains at least one regular intra-prediction mode. According to some embodiments where said plurality of Prediction Modes contains at least one DC element signaling a DC intra prediction mode, said information is coded instead, before and/or after at least one of said DC element. According to some embodiments where said plurality of Prediction Modes contains at least one Planar element signaling a Planar intra prediction mode, said information is coded instead, before and/or after at least one of said Planar element.

According to some embodiments, the at least one processor is adapted for, or the method comprises, encoding at least one parameter of said first and/or second single transformation in a bitstream (for instance at a frame level). According to some embodiments, said parameter is obtained by training a Deep Neural Network.

Some aspects of the present disclosure relate to a device comprising at least one processor adapted for encoding image data, or a method for encoding image data, a variable coding length being used for signaling a plurality of Prediction Modes by said encoding, the at least one processor being adapted for, or the method comprising:
intra-predicting at least one first block of said image data by using an intra-prediction mode using at least one first transformation, said at least one first transformation being obtained by taking account of said first block size,
encoding an information signaling a use of said intra-prediction mode in a bitstream, said information being encoded as one of said plurality of Prediction Modes.

Some embodiments relate to a method for encoding image data comprising, or a device comprising at least one processor adapted for encoding image data and for, intra-predicting, or predicting by combining inter-prediction and intra-prediction, at least one first block of said image data by using an intra-prediction mode using a first single transformation for predicting blocks of said first block size, said intra-prediction mode using a second single transformation for intra-predicting a second block of said image data of a different size than said first block size.

Some aspects of the present disclosure relate to a device comprising at least one processor adapted for, or a method comprising, reconstructing at least one first block of an image data encoded in a bitstream, by using an intra-prediction mode signaling a use a first single transformation, said first single transformation taking account of said first block size.

According to some embodiments, according to said intra-prediction mode, blocks of said image data having said first block size are intra-predicted by using said first single transformation for predicting. According to some embodiments, according to said intra-prediction mode, blocks of said image data having a size different than said first block size are intra-predicted by using a second single transformation.

According to some embodiments, said first single transformation is obtained from a set comprising a single matrix and a single bias vector.

According to some embodiments, when said block size is 4×4 pixels, said single matrix has a size of 16×4 pixels and/or said single vector has a size of 16 pixels. According to some embodiments, when said block size is 4×8 pixels, 8×4 pixels or 8×8 pixels, said single matrix has a size of 16×8 pixels and/or said single vector has a size of 16 pixels. According to some embodiments, wherein when said block size is other than 4×4 pixels 4×8 pixels, 8×4 pixels or 8×8 pixels, said single matrix has a size of 64×8 pixels and/or said single vector has a size of 64 pixels.

According to some embodiments, a variable coding length is used for signaling a plurality of Prediction Modes (MPM) in said bitstream, said variable coding length ordering said prediction modes, and said information is encoded as one of said plurality of Prediction Modes. According to some embodiments, said plurality of Prediction Modes contains at least one regular intra-prediction mode. According to some embodiments, when said plurality of Prediction Modes contains at least one DC element signaling a DC intra prediction mode, said information is coded instead, before and/or after at least one of said DC element. According to some embodiments, when said plurality of Prediction Modes contains at least one Planar element signaling a Planar intra prediction mode, said information is coded instead, before and/or after at least one of said Planar element.

According to some embodiments, the method comprises encoding at least one parameter of said first and/or second single transformation in a bitstream (for instance at a frame level). According to some embodiments, said at least one parameter is obtained by training a Deep Neural Network Some aspects of the present disclosure relate to a device comprising at least one processor adapted for, or a method comprising, decoding image data, a variable coding length being used for signaling a use of a plurality of Prediction Modes for encoding said image data, said processor being adapted for, or the method comprising:
reconstructing at least one first block of said image data by using an intra-prediction mode signaling a use of at least one first transformation taking account of said first block size,
decoding an information signaling a use of said intra-prediction mode in a bitstream, said information being encoded as one of said plurality of Prediction Modes Some aspects relate to a non-transitory program storage device, readable by a computer, tangibly embodying a program of instructions executable by the computer to perform any of the above methods of the present disclosure, in any of its embodiments.

[1] A. M. Kotra, B. Wang, S. Esenlik, H. Gao, J. Chen, M. G. Sarwer, G. W. Hsu, Y. W. Huang, S. M. Lei, L. Li, J. Heo, J. Choi, S. Yoo, J. Lim, S. Kim, A. K. Ramasubramonian, G. Van der Auwera, M. Karczewicz. JVET-L0222 CE3 6.6.1: a simple 6-MPM list construction with truncated binary coding for non-MPM signaling. Joint Video Exploration Team (JVET) of ITU-T SG 16 WP 3 and ISO/IEC JTC 1/SC 29/WG 11, 12$^{th}$ meeting in Macao, CN, 3 to 12 Oct. 2018.

[2] Jonathan Pfaff, Björn Stallenberger, Michael Schäfer, Philipp Merkle, Philipp Helle, Tobias Hinz, Heiko Schwarz, Detlev Marpe, Thomas Wiegand. JVET-N0217 CE3: affine linear weighted intra prediction (CE3-4.1, CE3-4.2). Joint Video Exploration Team (JVET) of ITU-T SG 16 WP 3 and ISO/IEC JTC 1/SC 29/WG 11, 14$^{th}$ meeting in Genva, CH, 19 to 27 Mar. 2019.

[3] Luong Pham Van, Geert Van der Auwera, Adarsh K. Ramasubramonian, Vadim Seregin, Marta Karczewicz. JVET-N0302 CE10: CIIP with position-independent weights. Joint Video Exploration Team (JVET) of ITU-T SG 16 WP 3 and ISO/IEC JTC 1/SC 29/WG 11, 14$^{th}$ meeting in Genva, CH, 19 to 27 Mar. 2019.

The invention claimed is:

1. A device for encoding image data using a first intra prediction mode, the device including one or more processors configured for:
    obtaining a set of averaged reference samples by averaging reference samples taken in a neighborhood of a current block of said image data;
    weighting the averaged reference samples of the set of averaged referenced samples using a matrix of weights and applying a vector of biases to the weighted averaged reference samples to obtain an intermediate block of values, wherein the matrix of weights and the vector of biases are selected exclusively based on a size of the current block; and
    obtaining a predictor for the current block by linearly interpolating the intermediate block of values.

2. The device of claim 1, wherein:
    responsive to the current block size being 4×4, the matrix of weights has a size of 16×4 and the vector of biases has a size of 16;
    responsive to the current block size being 4×8, 8×4, or 8×8, the matrix of weights has a size of 16×8 and the vector of biases has a size of 16; and
    responsive to the current block size being different than 4×4, 4×8, 8×4, or 8×8, the matrix of weights has a size of 64×8 and the vector of biases has a size of 64.

3. The device of claim 1, further comprising:
    constructing an ordered list of most probable intra prediction modes for the current block, each intra prediction mode of the ordered list being associated with a variable length code as a function of its rank in the ordered list;
    adding the first intra prediction mode to the ordered list in a first or second highest position in the ordered list; and
    encoding information in a bitstream based on the ordered list, the information signaling a use of the first intra prediction mode.

4. The device of claim 1, further comprising:
    constructing an ordered list of most probable intra prediction modes for the current block, each intra prediction mode of the ordered list being associated with a variable length code as a function of its rank in the ordered list;
    adding the first intra prediction mode to the ordered list at a position immediately before or immediately after a position of a DC prediction mode; and
    encoding information in a bitstream based on the ordered list, the information signaling a use of the first intra prediction mode.

5. The device of claim 1, further comprising:
    constructing an ordered list of most probable intra prediction modes for the current block, each intra prediction mode of the ordered list being associated with a variable length code as a function of its rank in the ordered list;
    adding the first intra prediction mode to the ordered list in place of a second intra prediction mode in the ordered list;
    associating the first intra prediction mode with the variable length code of the second intra prediction mode, the second intra prediction mode being a planar intra prediction mode or a DC intra prediction mode; and
    encoding information in a bitstream based on the ordered list, the information signaling a use of the first intra prediction mode.

6. A method for encoding image data using a first intra prediction mode, the method comprising:
    obtaining a set of averaged reference samples by averaging reference samples taken in a neighborhood of a current block of said image data;
    weighting the averaged reference samples of the set of average reference samples using a matrix of weights and applying a vector of biases to the weighted averaged reference samples to obtain an intermediate block of values, wherein the matrix of weights and the vector of biases are selected exclusively based on a size of the current block; and
    obtaining a predictor for the current block by linearly interpolating the intermediate block of values.

7. The method of claim 6, wherein:
    responsive to the current block size being 4×4, the matrix of weights has a size of 16×4 and the vector of biases has a size of 16;
    responsive to the current block size being 4×8, 8×4, or 8×8, the matrix of weights has a size of 16×8 and the vector of biases has a size of 16; and
    responsive to the current block size being different than 4×4, 4×8, 8×4, or 8×8, the matrix of weights has a size of 64×8 and the vector of biases has a size of 64.

8. The method of claim 6, further comprising:
    constructing an ordered list of most probable intra prediction modes for the current block, each intra prediction mode of the ordered list being associated with a variable length code as a function of its rank in the ordered list;
    adding the first intra prediction mode to the ordered list in a first or second highest position in the ordered list; and
    encoding information in a bitstream based on the ordered list, the information signaling a use of the first intra prediction mode.

9. The method of claim 6, further comprising:
    constructing an ordered list of most probable intra prediction modes for the current block, each intra prediction mode of the ordered list being associated with a variable length code as a function of its rank in the ordered list;
    adding the first intra prediction mode to the ordered list at a position immediately before or immediately after a position of a DC prediction mode; and encoding information in a bitstream based on the ordered list, the information signaling a use of the first intra prediction mode.

10. The method of claim 6, further comprising:
constructing an ordered list of most probable intra prediction modes for the current block, each intra prediction mode of the ordered list being associated with a variable length code as a function of its rank in the ordered list;
adding the first intra prediction mode to the ordered list in place of a second intra prediction mode in the ordered list;
associating the first intra prediction mode with the variable length code of the second intra prediction mode, the second intra prediction mode being a planar intra prediction mode or a DC intra prediction mode; and
encoding information in a bitstream based on the ordered list, the information signaling a use of the first intra prediction mode.

11. A device for decoding image data using a first intra prediction mode, the device including one or more processors configured for:
obtaining a set of averaged reference samples by averaging reference samples taken in a neighborhood of a current block of said image data;
weighting the averaged reference samples of the set of averaged referenced samples using a matrix of weights and applying a vector of biases to the weighted averaged reference samples to obtain an intermediate block of values, wherein the matrix of weights and the vector of biases are selected exclusively based on a size of the current block; and
obtaining a predictor for the current block by linearly interpolating the intermediate block of values.

12. The device of claim 11, wherein:
responsive to the current block size being 4×4, the matrix of weights has a size of 16×4 and the vector of biases has a size of 16;
responsive to the current block size being 4×8, 8×4, or 8×8, the matrix of weights has a size of 16×8 and the vector of biases has a size of 16; and
responsive to the current block size being different than 4×4, 4×8, 8×4, or 8×8, the matrix of weights has a size of 64×8 and the vector of biases has a size of 64.

13. The device of claim 11, the one or more processors further configured for:
constructing an ordered list of most probable intra prediction modes for the current block, each intra prediction mode of the ordered list being associated with a variable length code as a function of its rank in the ordered list;
adding the first intra prediction mode to the ordered list in a first or second highest position in the ordered list; and
decoding information from a bitstream based on the ordered list, the information signaling a use of the first intra prediction mode.

14. The device of claim 11, the one or more processors further configured for:
constructing an ordered list of most probable intra prediction modes for the current block, each intra prediction mode of the ordered list being associated with a variable length code as a function of its rank in the ordered list;
adding the first intra prediction mode to the ordered list at a position immediately before or immediately after a position of a DC prediction mode; and
decoding information from a bitstream based on the ordered list, the information signaling a use of the first intra prediction mode.

15. The device of claim 11, the one or more processors further configured for:
constructing an ordered list of most probable intra prediction modes for the current block, each intra prediction mode of the ordered list being associated with a variable length code as a function of its rank in the ordered list;
adding the first intra prediction mode to the ordered list in place of a second intra prediction mode in the ordered list;
associating the first intra prediction mode with the variable length code of the second intra prediction mode, the second intra prediction mode being a planar intra prediction mode or the DC intra prediction mode; and
decoding information from a bitstream based on the ordered list, the information signaling a use of the first intra prediction mode.

16. The device of claim 11, wherein an encoding mode based on a multiple transform selection or on a non-separable secondary transform is disabled and no syntax element is decoded for the encoding mode when the first intra prediction mode is enabled.

17. The device of claim 11, wherein the first intra prediction mode is a combined intra inter prediction mode.

18. The device of claim 11, wherein the one or more processors is further configured for decoding at least one parameter representative of the matrix of weights and the vector of biases from a bitstream.

19. The device of claim 11, wherein the matrix of weights and the vector of biases are learned using a training method.

20. A method for decoding image data using a first intra prediction mode, the method comprising:
obtaining a set of reference samples by averaging reference samples taken in a neighborhood of a current block of said image data;
weighting the averaged reference samples of the set of average reference samples using a matrix of weights and applying a vector of biases to the weighted averaged reference samples to obtain an intermediate block of values, wherein the matrix of weights and the vector of biases are selected exclusively based on a size of the current block; and
obtaining a predictor for the current block by linearly interpolating the intermediate block of values.

21. The method of claim 20, wherein:
responsive to the current block size being 4×4, the matrix of weights has a size of 16×4 and the vector of biases has a size of 16;
responsive to the current block size being 4×8, 8×4, or 8×8, the matrix of weights has a size of 16×8 and the vector of biases has a size of 16; and
responsive to the current block size being different than 4×4, 4×8, 8×4, or 8×8, the matrix of weights has a size of 64×8 and the vector of biases has a size of 64.

22. The method of claim 20, further comprising:
constructing an ordered list of most probable intra prediction modes for the current block, each intra prediction mode of the ordered list being associated with a variable length code as a function of its rank in the ordered list;
adding the first intra prediction mode to the ordered list in a first or second highest position in the ordered list; and decoding information from a bitstream based on the ordered list, the information signaling a use of the first intra prediction mode.

23. The method of claim 20, further comprising:
constructing an ordered list of most probable intra prediction modes for the current block, each intra prediction mode of the ordered list being associated with a variable length code as a function of its rank in the ordered list;
adding the first intra prediction mode to the ordered list at a position immediately before or immediately after a position of a DC prediction mode; and
decoding information from a bitstream based on the ordered list, the information signaling a use of the first intra prediction mode.

24. The method of claim 20, further comprising:
constructing an ordered list of most probable intra prediction modes for the current block, each intra prediction mode of the ordered list being associated with a variable length code as a function of its rank in the ordered list;
adding the first intra prediction mode to the ordered list in place of a second intra prediction mode in the ordered list;
associating the first intra prediction mode with the variable length code of the second intra prediction mode, the second intra prediction mode being a planar intra prediction mode or the DC intra prediction mode; and
decoding information from a bitstream based on the ordered list, the information signaling a use of the first intra prediction mode.

25. The method of claim 20, wherein an encoding mode based on a multiple transform selection or on a non-separable secondary transform is disabled and no syntax element is decoded for the encoding mode when the first intra prediction mode is enabled.

26. The method of claim 20, wherein the first intra prediction mode is a combined intra inter prediction mode.

27. The method of claim 20, wherein the matrix of weights and the vector of biases are learned using a training method.

28. Non-transitory information storage medium storing program code instructions for implementing the method according to claim 20.

* * * * *